US010706613B2

(12) United States Patent
Ye et al.

(10) Patent No.: US 10,706,613 B2
(45) Date of Patent: Jul. 7, 2020

(54) SYSTEMS AND METHODS FOR DYNAMIC OCCLUSION HANDLING

(71) Applicant: Robert Bosch GmbH, Stuttgart (DE)

(72) Inventors: Mao Ye, San Jose, CA (US); Yen-Lin Chen, San Jose, CA (US); Liu Ren, Cupertino, CA (US); Chao Du, Lexington, KY (US)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 15/633,221

(22) Filed: Jun. 26, 2017

(65) Prior Publication Data
US 2017/0372510 A1 Dec. 28, 2017

Related U.S. Application Data

(60) Provisional application No. 62/354,891, filed on Jun. 27, 2016.

(51) Int. Cl.
| | |
|---|---|
| *G06T 15/40* | (2011.01) |
| *G06T 7/55* | (2017.01) |
| *G06T 19/00* | (2011.01) |
| *G06T 5/50* | (2006.01) |

(52) U.S. Cl.
CPC .............. *G06T 15/405* (2013.01); *G06T 5/50* (2013.01); *G06T 7/55* (2017.01); *G06T 19/006* (2013.01);
(Continued)

(58) Field of Classification Search
CPC .............. G06T 15/405; G06T 2200/04; G06T 2207/10024; G06T 2207/10028; G06T 7/55
See application file for complete search history.

(56) References Cited

U.S. PATENT DOCUMENTS

| | | | |
|---|---|---|---|
| 8,144,238 B2 | 3/2012 | Kotake et al. | |
| 9,305,360 B2 * | 4/2016 | Parfenov | G06T 5/003 |

(Continued)

FOREIGN PATENT DOCUMENTS

| | | |
|---|---|---|
| JP | 2016-48467 | 4/2016 |
| WO | 2013173749 A1 | 11/2013 |

OTHER PUBLICATIONS

A.Y.C. Nee and S.K. Ong, "Virtual and Augmented Reality Applications in Manufacturing," 2013, pp. 15-26.

(Continued)

*Primary Examiner* — Ming Wu
(74) *Attorney, Agent, or Firm* — Kathy K. Takeguchi; Maginot, Moore & Beck LLP

(57) ABSTRACT

A computing system includes a processing system with at least one processing unit. The processing system is configured to receive a depth map with a first boundary of an object. The processing system is configured to receive a color image that corresponds to the depth map. The color image includes a second boundary of the object. The processing system is configured to extract depth edge points of the first boundary from the depth map. The processing system is configured to identify target depth edge points on the depth map. The target depth edge points correspond to color edge points of the second boundary of the object in the color image. In addition, the processing system is configured to snap the depth edge points to the target depth edge points such that the depth map is enhanced with an object boundary for the object.

17 Claims, 20 Drawing Sheets

(52) U.S. Cl.
CPC .............. *G06T 2200/04* (2013.01); *G06T 2207/10024* (2013.01); *G06T 2207/10028* (2013.01)

(56) References Cited

U.S. PATENT DOCUMENTS

| | | | | |
|---|---|---|---|---|
| 2007/0265813 | A1* | 11/2007 | Unal | G06T 7/0012 703/2 |
| 2012/0155719 | A1* | 6/2012 | Yun | G06K 9/00362 382/118 |
| 2012/0200669 | A1* | 8/2012 | Lai | G06T 5/002 348/43 |
| 2012/0206452 | A1* | 8/2012 | Geisner | G02B 27/017 345/419 |
| 2014/0016862 | A1 | 1/2014 | Taguchi | |
| 2014/0152776 | A1 | 6/2014 | Cohen et al. | |
| 2014/0269935 | A1 | 9/2014 | Gaddy et al. | |
| 2014/0294237 | A1 | 10/2014 | Litvak et al. | |
| 2015/0062117 | A1 | 3/2015 | Reitmayr | |
| 2015/0071526 | A1* | 3/2015 | Nguyen | G06T 5/10 382/154 |
| 2015/0139533 | A1 | 5/2015 | Wu et al. | |
| 2016/0048970 | A1* | 2/2016 | Loghman | G06T 7/593 382/154 |
| 2016/0086299 | A1* | 3/2016 | Sharma | G06T 1/20 345/422 |
| 2016/0140761 | A1 | 5/2016 | Saunders et al. | |

OTHER PUBLICATIONS

M.-O. Berger, "Resolving Occlusion in Augmented Reality: a Contour Based Approach without 3D Reconstruction," IEEE Computer Society Conference on Computer Vision and Pattern Recognition, 1997, pp. 91-96.

G. Klein and T. Drummond, "Sensor Fusion and Occlusion Refinement for Tablet-based AR," Proceedings of the Third IEEE and ACM International Symposium on Mixed and Augmented Reality, 2004.

S. Dong, C. Feng and V. R. Kamat, "Real-Time Occlusion Handling for Dynamic Augmented Reality Using Geometric Sensing and Graphical Shading," Journal of Computing in Civil Engineering, Nov./Dec. 2013, pp. 607-621.

J. Shen and S. Cheung, "Layer Depth Denoising and Completion for Structured-Light RGB-D Cameras," IEEE Conference on Computer Vision and Pattern Recognition, 2013, pp. 1187-1194.

E. N. Mortensen and W. A. Barrett, "Interactive Segmentation with Intelligent Scissors," Graphical Models and Image Processing, 1998.

Yue et al., "Combining color and depth data for edge detection", Proceeding of the IEEE International Conference on Robotics and Biometrics (ROBIO), IEEE, Dec. 2013, pp. 928-933.

Chen et al., "Depth edge based trilateral filter method for stereo matching", 2015 IEEE International Conference on Image Processing (ICIP), IEEE, Sep. 27, 2015, pp. 2280-2284.

Deng et al., "Texture edge-guided depth recovery for structured light-based depth sensor", Multimedia Tools and Applications, Kluwer Academic Publishers, vol. 76, No. 3, Feb. 17, 206, pp. 4211-4226.

Khattak et al., "A real-time reconstructed 3D environment augmented with virtual objects rendered with correct occlusion", 2014 IEEE Games Media Entertainment, Oct. 1, 2014, pp. 1-8.

Schmeing et al., "Edge-aware depth image filtering using color segmentation", Pattern Recognition Letters, Elsevier, Amsterdam, NL, vol. 50, Apr. 15, 2014, pp. 63-71.

Xu et al., "Depth map misalignment correction and dilation for DIBR view synthesis", Signal Processing, Image Communication, Elsevier Science Publishers, Amsterdam, NL, vol. 28, No. 9, Apr. 22, 2013, pp. 1023-1045.

\* cited by examiner

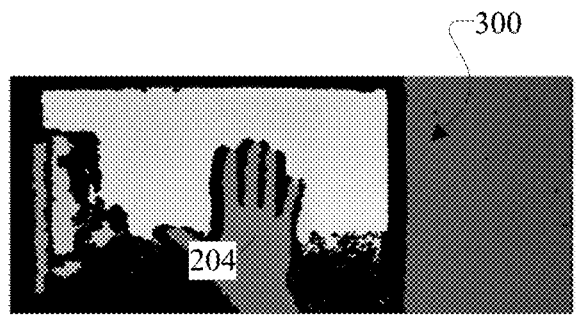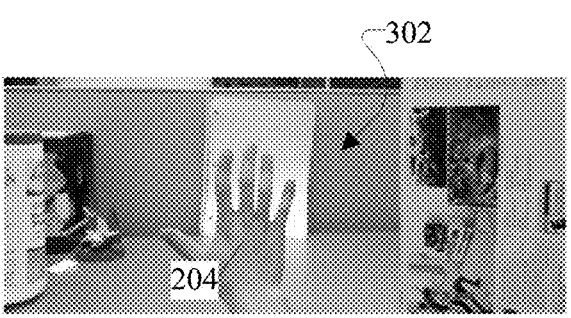
FIG. 3A  FIG. 3B
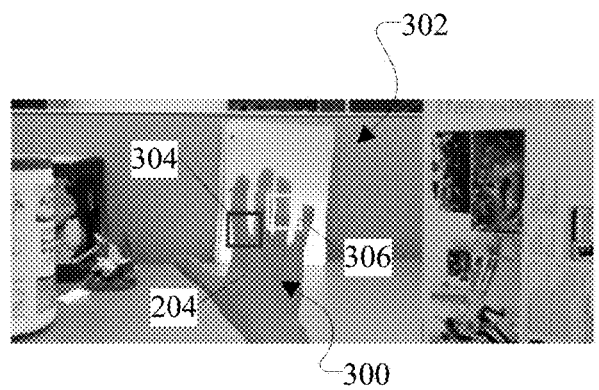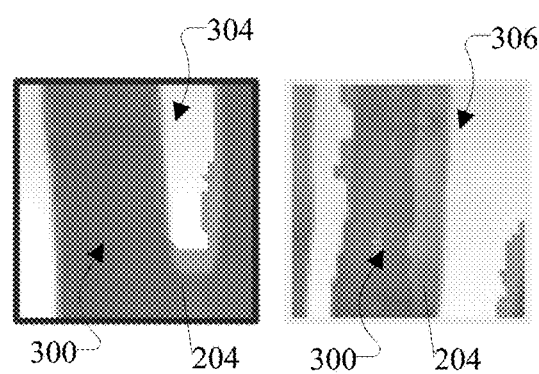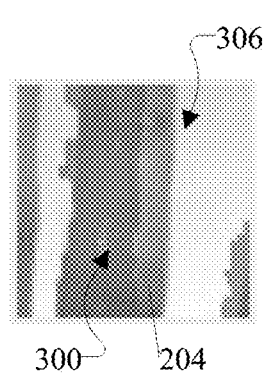
FIG. 3C  FIG. 3D  FIG. 3E
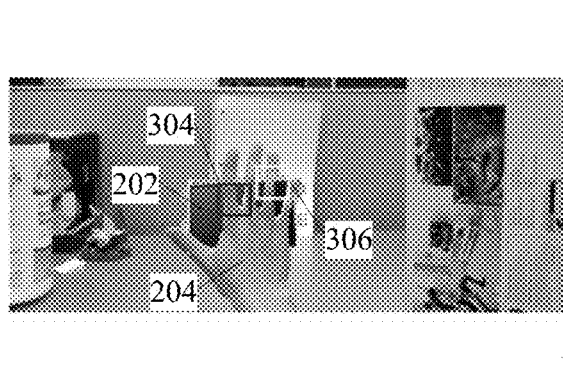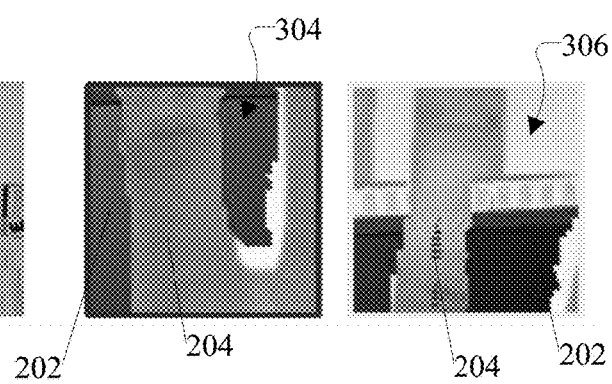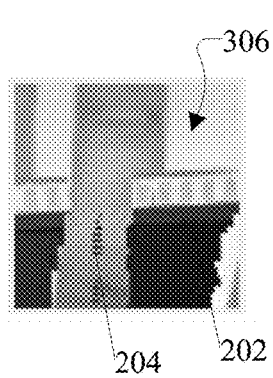
FIG. 3F  FIG. 3G  FIG. 3H

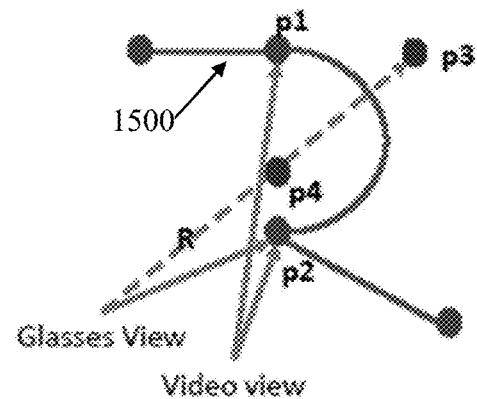
FIG. 15A
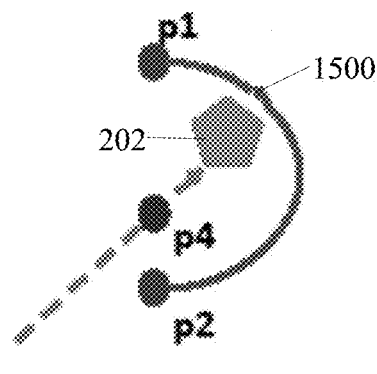 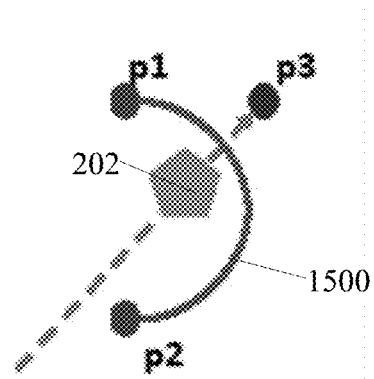
FIG. 15B FIG. 15C

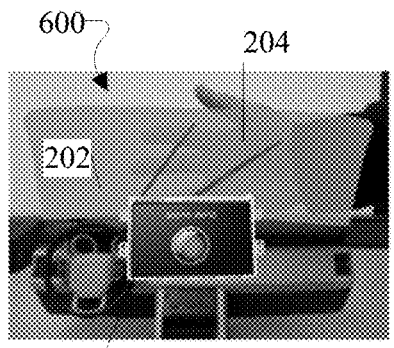 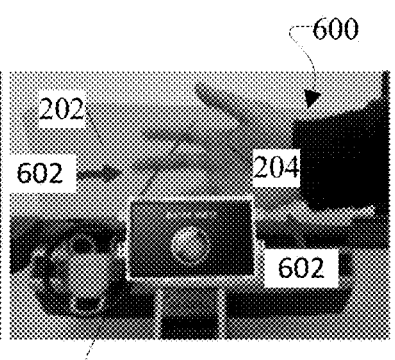 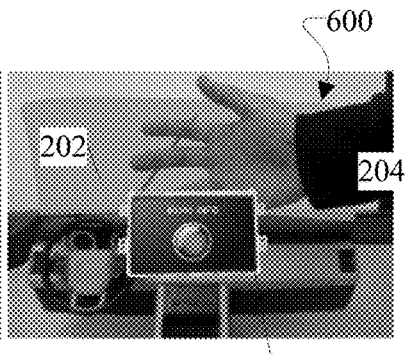
FIG. 16A　　　　FIG. 16B　　　　FIG. 16C
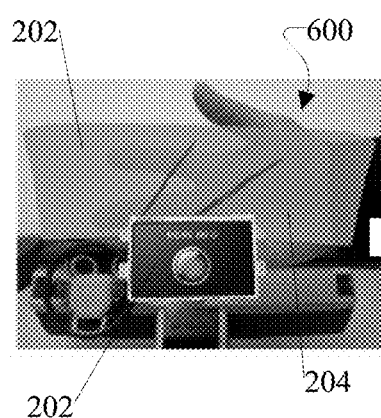 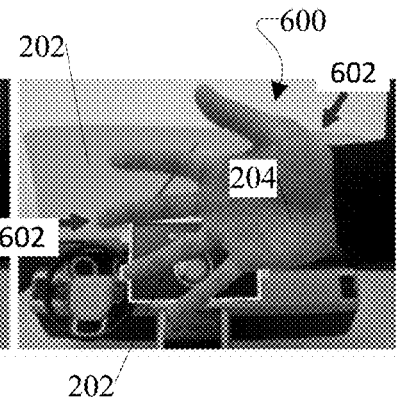 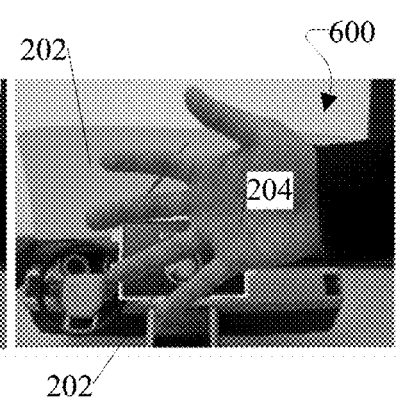
FIG. 17A　　　　FIG. 17B　　　　FIG. 17C
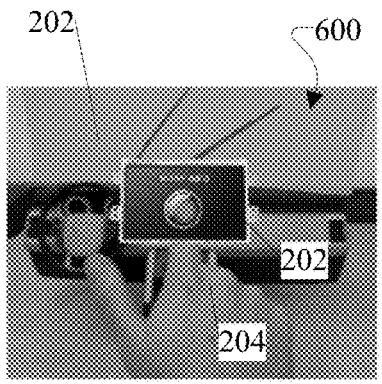 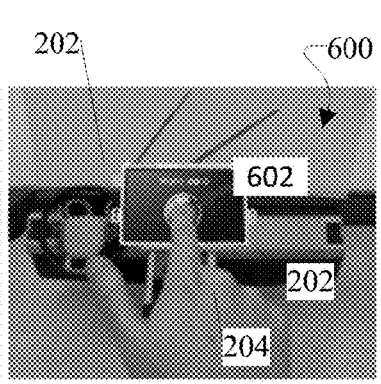 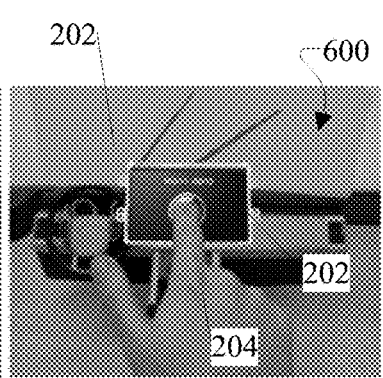
FIG. 18A　　　　FIG. 18B　　　　FIG. 18C

SYSTEMS AND METHODS FOR DYNAMIC OCCLUSION HANDLING

CROSS-REFERENCE TO RELATED APPLICATION

This application claims the benefit of U.S. Provisional Patent Application No. 62/354,891, which was filed on Jun. 27, 2016, and which is hereby incorporated herein by reference in its entirety.

FIELD OF THE INVENTION

This disclosure relates to systems and methods for enhancing depth maps, and more particularly to dynamic occlusion handling with enhanced depth maps.

BACKGROUND

Augmented Reality (AR) relates to technology that provides a composite view of a real-world environment together with a virtual-world environment (e.g., computer generated input). Correct perception of depth is often needed to deliver a realistic and seamless AR experience. For example, in AR-assisted maintenance or manufacturing tasks, the user tends to interact frequently with both real and virtual objects. However, without correct depth perception, it is difficult to provide a seamless interaction experience with the appropriate occlusion handling between the real-world scene and the virtual-world scene.

In general, real-time 3D sensing is computationally expensive and requires high-end sensors. To reduce this overhead, some early work relies on 2D contour tracking to infer an occlusion relationship, which is typically assumed to be fixed. Alternatively, some other work includes building 3D models of the scene offline and using these 3D models online for depth testing, assuming the scene is static and remains unchanged. Although these methods can achieve some occlusion handling effects, they cannot accommodate the dynamic nature of user interactions which are very common in AR applications.

Also, the recent arrival of lightweight RGB-Depth (RGB-D) cameras provide some 3D sensing capabilities for AR applications. However, these RGB-D cameras typically have low cost consumer depth sensors, which usually suffer from various types of noises, especially around object boundaries. Such limitations typically cause unsuitable visual artifacts when these lightweight RGB-D cameras are used for AR applications, thereby prohibiting decent AR experiences. Plenty of research has been done for depth map enhancement to improve the quality of sensor data provided by these lightweight RGB-D cameras. However, the majority of these approaches cannot be directly applied to AR use cases due to their high computational cost.

In addition, filtering is often used for image enhancement. For instance, some examples include a joint bilateral filtering process or a guided image filtering process. Also, other examples include a domain transform process, an adaptive manifolds process, or an inpainting process. However, these processes are typically computationally expensive and often result in edge blurring, thereby causing interpolation artifacts around boundaries.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a computing system includes a processing system with at least one processing unit. The processing system is configured to receive a depth map with a first boundary of an object. The processing system is configured to receive a color image that corresponds to the depth map. The color image includes a second boundary of the object. The processing system is configured to extract depth edge points of the first boundary from the depth map. The processing system is configured to identify target depth edge points on the depth map. The target depth edge points correspond to color edge points of the second boundary of the object in the color image. In addition, the processing system is configured to snap the depth edge points to the target depth edge points such that the depth map is enhanced with an object boundary for the object.

In an example embodiment, a system for dynamic occlusion handling includes at least a depth sensor, a camera, and a processing system. The depth sensor is configured to provide a depth map. The depth map includes a first boundary of an object. The camera is configured to provide a color image. The color image includes a second boundary of the object. The processing system includes at least one processing unit. The processing system is configured to receive the depth map with the first boundary of an object. The processing system is configured to receive a color image that corresponds to the depth map. The color image includes a second boundary of the object. The processing system is configured to extract depth edge points of the first boundary from the depth map. The processing system is configured to identify target depth edge points on the depth map. The target depth edge points correspond to color edge points of the second boundary of the object in the color image. The processing system is configured to snap the depth edge points to the target depth edge points such that the depth map is enhanced with an object boundary for the object.

In an example embodiment, a computer-implemented method includes receiving a depth map with a first boundary of an object. The method includes receiving a color image that corresponds to the depth map. The color image includes a second boundary of the object. The method includes extracting depth edge points of the first boundary from the depth map. The method includes identifying target depth edge points on the depth map. The target depth edge points correspond to color edge points of the second boundary of the object in the color image. The method includes snapping the depth edge points towards the target depth edge points such that the depth map is enhanced with an object boundary for the object.

These and other features, aspects, and advantages of the present invention are further clarified by the following detailed description of certain exemplary embodiments in view of the accompanying drawings throughout which like characters represent like parts.

BRIEF DESCRIPTION OF THE DRAWINGS

FIG. 3A is an example of a depth map according to an example embodiment of this disclosure.

FIG. 3B is an example of a color image according to an example embodiment of this disclosure.

FIG. 3C illustrates an example of the depth map of FIG. 3A overlaying the color image of FIG. 3B according to an example embodiment of this disclosure.

FIGS. 3D and 3E are enlarged views of exemplary regions of FIG. 3C.

FIG. 3F is a visualization of FIG. 3C together with a virtual object.

FIGS. 3G and 3H are enlarged views of exemplary regions of FIG. 3F.

FIG. 15A illustrates an issue associated with changing between video view and glasses view.

FIG. 15B illustrates an example of occlusion effects using interpolation.

FIG. 15C illustrates an example of occlusion effects using the process of FIG. 14 according to an example embodiment of this disclosure.

FIG. 16A is an example of an AR scene without dynamic occlusion handling.

FIG. 16B is an example of an AR scene with dynamic occlusion handling using raw depth data according to an example embodiment of this disclosure.

FIG. 16C is an example of an AR scene with dynamic occlusion handling using an enhanced depth map according to an example embodiment of this disclosure.

FIG. 17A is an example of an AR scene without dynamic occlusion handling.

FIG. 17B is an example of an AR scene with dynamic occlusion handling using raw depth data according to an example embodiment of this disclosure.

FIG. 17C is an example of an AR scene with dynamic occlusion handling using an enhanced depth map according to an example embodiment of this disclosure.

FIG. 18A is an example of an AR scene without dynamic occlusion handling.

FIG. 18B is an example of an AR scene with dynamic occlusion handling using raw depth data according to an example embodiment of this disclosure.

FIG. 18C is an example of an AR scene with dynamic occlusion handling using an enhanced depth map according to an example embodiment of this disclosure.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
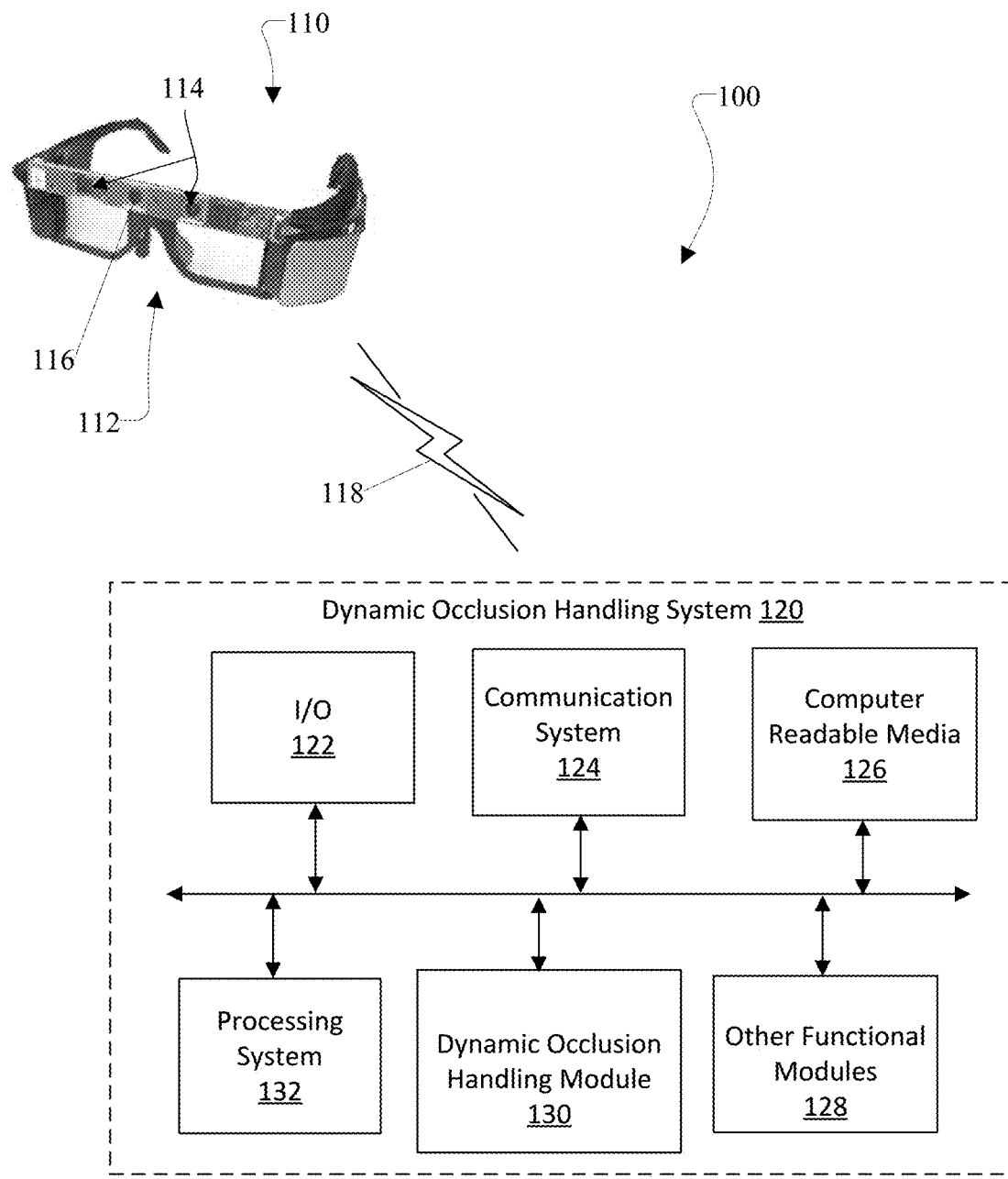
FIG. 1 is a diagram of a system according to an example embodiment of this disclosure.

FIG. 1 illustrates a block diagram of a system 100 for dynamic occlusion handling in AR according to an example embodiment. In an example embodiment, the system 100 includes a head mounted display 110 and a dynamic occlusion handling system 120. In addition, the system 100 includes communication technology 118 that connects the head mounted display 110 to the dynamic occlusion handling system 120. In an example embodiment, the communication technology 118 is configured to provide at least data transfer between the head mounted display 110 and the dynamic occlusion system 120. In an example embodiment, the communication technology 118 includes wired technology, wireless technology, or a combination thereof. As non-limiting examples, the communication technology 118 includes HDMI technology, WiFi technology, or any suitable communication link.

In an example embodiment, the head mounted display 110 is an optical head mounted display, which is enabled to reflect projected images while allowing a user to see through it. In an example embodiment, the head mounted display 110 includes at least a depth sensor 114 and a video camera 116. In FIG. 1, for instance, the head mounted display 110 includes an RGB-D camera 112, which includes a depth sensor 114 and a video camera 116. In an example embodiment, the RGB-D camera 112 can be near-range.

In an example embodiment, the depth sensor 114 is configured to provide depth data, as well as geometry information for dynamic occlusion handling. In this regard, for instance, the depth sensor 114 is a structured-light sensor or Time-of-Flight sensor. Alternatively, a stereo sensor can be used to obtain dynamic depth information. In an example embodiment, depending upon the application, the depth sensor 114 can have any suitable sensing range. For instance, in FIG. 1, the RGB-D camera 112 includes a depth sensor 114 with a sensing range of 0.2 m to 1.2 m, which is sufficient to cover an area of AR interactions involving the user's hands 204.

In an example embodiment, the video camera 116 is configured to provide video or a recorded series of color images. In an example embodiment, the video camera 116 is configured to provide scene tracking (e.g., visual SLAM). In addition, since the glasses view 212, provided by the head mounted display 110, is unable to provide information for dynamic occlusion handling, the system 100 uses the video data from the video view 200 and adopts the video view 200 as the glasses view 212 to provide dynamic occlusion handling.

In an example embodiment, the system 100 includes the dynamic occlusion handling system 120. In an example embodiment, the dynamic occlusion handling system 120 is any suitable computing system that includes a dynamic occlusion handling module 130 and that can implement the functions disclosed herein. As non-limiting examples, the computing system is a personal computer, a laptop, a tablet, or any suitable computer technology that is enabled to implement the functions of the dynamic occlusion handling module 130.

In au example embodiment, the computing system includes at least input/output (I/O) devices 122, a communication system 124, computer readable media 126, other functional modules 128, and a processing system 132. In an example embodiment, the devices can include any suitable device or combination of devices, such as a keyboard, a speaker, a microphone, a display, etc. In an example embodiment, the communication system 124 includes any suitable communication means that enables the components of the dynamic occlusion handling system 120 to communicate with each other and also enables the dynamic occlusion handling system 120 to communicate with die head mounted display 110 via the communication technology 118. Also, in an example embodiment, the communication system 124 includes any suitable communication means that enables the dynamic occlusion handling system 120 to connect to the Internet, as well as with other computing systems and/or devices on a computer network or any suitable network. In an example embodiment, the computer readable media 126 is a computer or electronic storage system that is configured to store and provide access to various data to enable the functions disclosed herein. In an example embodiment, the computer readable media 126 can include electrical, electronic, magnetic, optical, semiconductor, electromagnetic, or any suitable memory technology. In an example embodiment, the computer readable media 126 is local, remote, or a combination thereof (e.g., partly local and partly remote). In an example embodiment, the other functional modules 128 can include hardware, software, or a combination thereof. For instance, the other functional modules 128 can include an operating system, logic circuitry, any hardware computing components, any software computing components, or any combination thereof. In an example embodiment, the processing system 132 includes at least one processing unit to perform and implement the dynamic occlusion handling in accordance with the dynamic occlusion handling module 130. In FIG. 1, for instance, the processing system 132 includes at least a central processing unit (CPU) and a graphics processing unit (GPU).

As discussed above, the dynamic occlusion handling system 120 includes a dynamic occlusion handling module 130. In an example embodiment, the dynamic occlusion handling module 130 includes hardware, software, or a combination thereof. In an example embodiment, the dynamic occlusion handling module 130 is configured to provide the requisite data and support to the processing system 132 such that a process 400 (e.g. FIG. 4) is enabled to execute and provide enhanced depth data and dynamic occlusion handling, thereby providing a realistic AR experience.

Figure 2A:
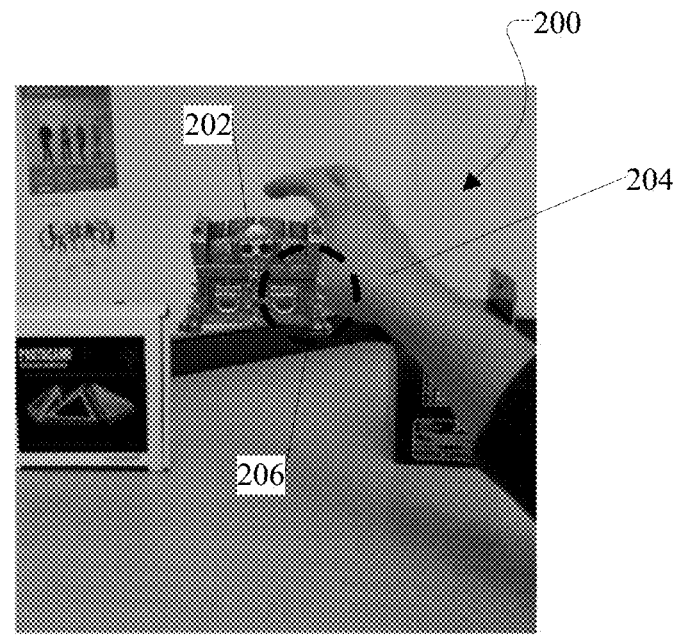
FIG. 2A is a rendering of a virtual object in video view without dynamic occlusion handling.
Figure 2B:
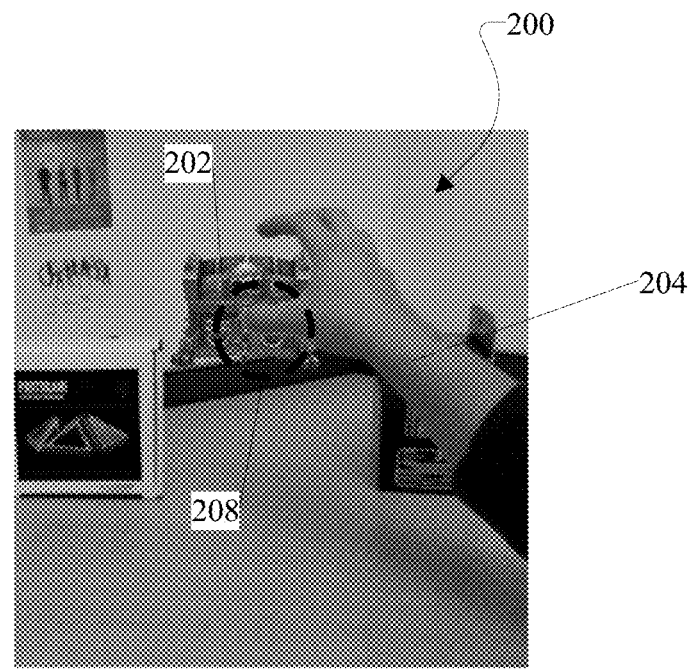
FIG. 2B is a rendering of a virtual object in video view with dynamic occlusion handling according to an example embodiment of this disclosure.

FIGS. 2A-2B illustrate non-limiting examples in which virtual objects 202 are rendered in video view 200, as the acquisition sensor space. Specifically, FIG. 2A illustrates a virtual object 202 rendering without dynamic occlusion handling while FIG. 2B illustrates a virtual object 202 rendering with dynamic occlusion handling. In this regard, in each of FIGS. 2A-2B, the virtual object 202 rendering includes a treasure chest as the virtual object 202. Also, in each of FIGS. 2A-2B, the remaining parts of this video view include the user's hand 204 in a real-world environment. However, without dynamic occlusion handling, the user's hand 204 is improperly occluded by the virtual object 202, as shown in the circled region 206 of FIG. 2A. That is, the circled region 206 of FIG. 2A does not provide a realistic portrayal of the user's hand 204 interacting with the virtual object 202. In contrast, with dynamic occlusion handling, the user's hand 204 is not occluded by the virtual object 202, as shown in the circled region 208 of FIG. 2B. As such, with dynamic occlusion handling, the circled region 208 of FIG. 2B is able to provide a realistic portrayal of the user's hand 204 interacting with the virtual object 202.

Figure 2C:
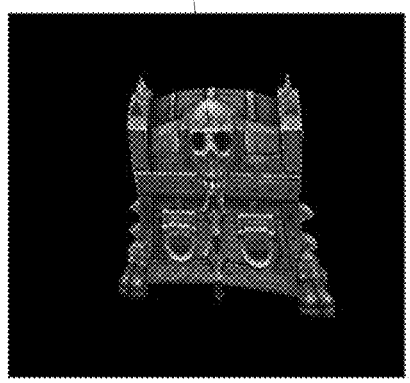
FIGS. 2C and 2D are renderings of the virtual object of FIG. 2A without dynamic occlusion handling.
Figure 2D:
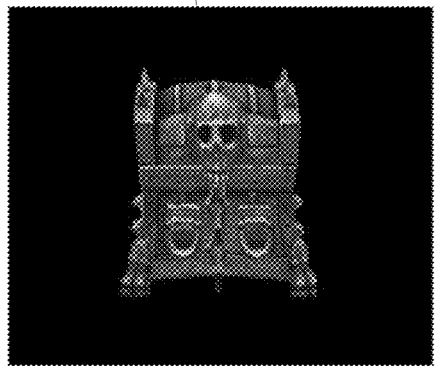
Figure 2E:
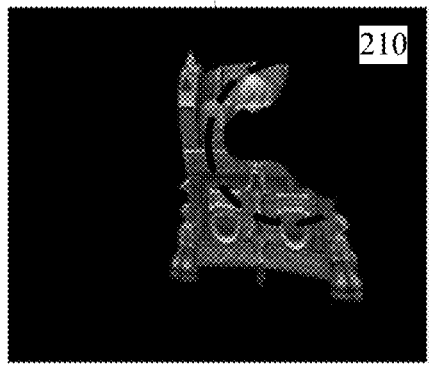
FIGS. 2E and 2F are renderings of the virtual object of FIG. 2B with dynamic occlusion handling according to an example embodiment of this disclosure.
Figure 2F:
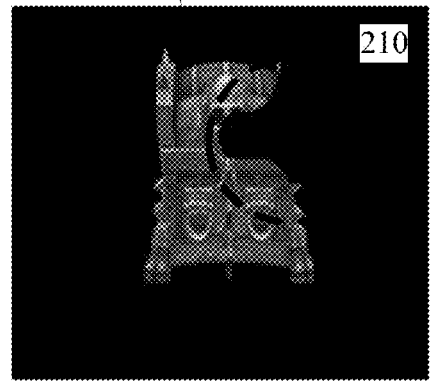

FIGS. 2C-2D and FIGS. 2E-2F relate to renderings of the virtual objects 202 of FIG. 2A and FIG. 2B, respectively. More specifically, FIGS. 2C-2D illustrate non-limiting examples of the rendering of the virtual objects 202 without dynamic occlusion handling. In this regard, FIG. 2C represents a left eye view of the rendering of the virtual object 202 and FIG. 2D represents a right eye view of the rendering of the virtual object 202. In contrast, FIGS. 2E-2F illustrate non-limiting examples of the rendering of the virtual objects 202 with dynamic occlusion handling. More specifically, FIG. 2E represents a left eye view of the rendering of the virtual object 202 and FIG. 2F represents a right eye view of the rendering of the virtual object 202. As shown in FIGS. 2E and 2F, with dynamic occlusion handling, the virtual object 202 is modified, as highlighted in each circled region 210, such that the virtual object 202 does not occlude the user's hand 204. Accordingly, with dynamic occlusion handling, the interaction between the virtual object 202 and the user's hand 204 is presented in a proper and realistic manner, as shown in at least the circled region 208 of FIGS. 2B and 2I-2J.

Figure 2G:
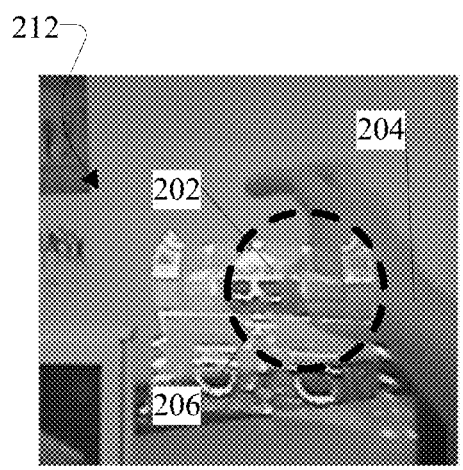
FIGS. 2G and 2H are visualizations of FIG. 2A in glasses view without dynamic occlusion handling.
Figure 2H:
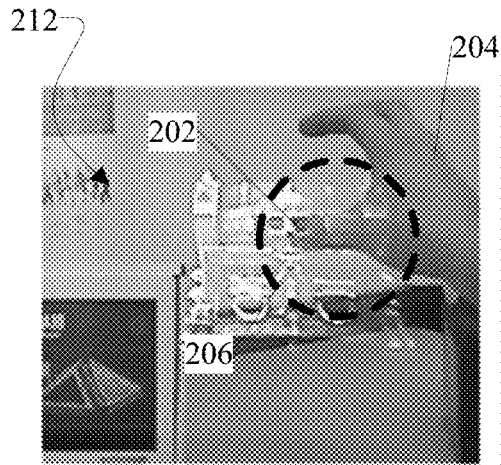
Figure 2I:
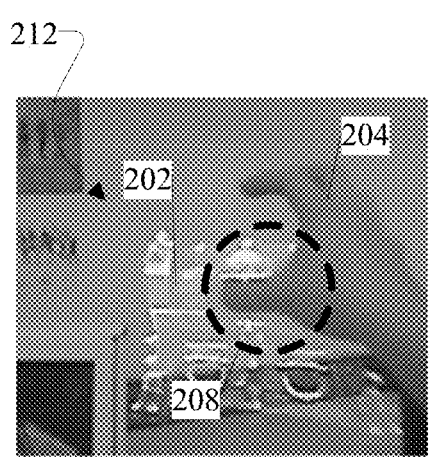
FIGS. 2I and 2J are visualizations of FIG. 2B in glasses view with dynamic occlusion handling according to an example embodiment of this disclosure.
Figure 2J:
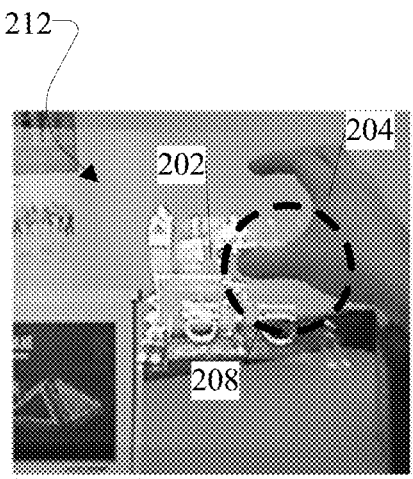

FIGS. 2G-2H and 2I-2J illustrate non-limiting examples of optical, see-through images of the virtual objects 202 in glasses view 212 via the optical head mounted display 110. FIGS. 2G-2H illustrate examples without dynamic occlusion handling. Specifically, FIG. 2G represents a left eye view of the virtual object 202 in the glasses view 212 and FIG. 2H represents a right eye view of the virtual object 202 in the glasses view 212. In contrast, FIGS. 2I-2J illustrate examples with dynamic occlusion handling. Specifically, FIG. 2I represents a left eye view of the virtual object 202 in the glasses view 212 and FIG. 2J represents a right eye view of the virtual object 202 in the glasses view 212. As evidenced by a comparison of FIGS. 2G-2H with that of FIGS. 2I-2J, the inclusion of the dynamic occlusion handling provides a more realistic and immersive experience, as the parts of the virtual objects 202 that should be occluded by the user's hands 204 are removed from view.

FIGS. 3A-3E provide non-limiting examples of mismatches between boundaries of objects taken from depth maps compared to corresponding boundaries of objects taken from color images. Specifically, FIG. 3A illustrates an example of a depth map 300 and FIG. 3B illustrates a corresponding example of a color image 302. In addition, FIG. 3C illustrates an example of the depth map 300 of FIG. 3A overlaying the color image 302 of FIG. 3B. Meanwhile, FIG. 3D illustrates an enlarged view of the boxed region 304 of FIG. 3C. FIG. 3E illustrates an enlarged view of the boxed region 306 of FIG. 3C. As shown in FIGS. 3C-3E, the boundary of the user's hand 204 in the depth map 300 does not match the corresponding boundary of the user's hand 204 in the color image 302.

FIGS. 3F-3H are example results based on dynamic occlusion handling with raw depth data from the depth map 300. Specifically, FIG. 3F includes dynamic occlusion handling, particularly with regard to a rendering of a virtual object 202 (e.g., smartphone) in relation to a user's hand 204. Meanwhile, FIG. 3G illustrates an enlarged view of the boxed region 304 of FIG. 3F. In addition, FIG. 3H illustrates an enlarged view of the boxed region 306 of FIG. 3F. As shown, when dynamic occlusion handling is performed with raw depth data, FIGS. 3F-3H include visual artifacts due to the mismatches in boundaries of at least the user's hand 204 between the raw depth map 300 and the color image 302. However, the system 100 includes a process 400, which is enabled to overcome this issue by improving the consistency of object boundaries, for instance, between depth data and RGB data.

Figure 4:
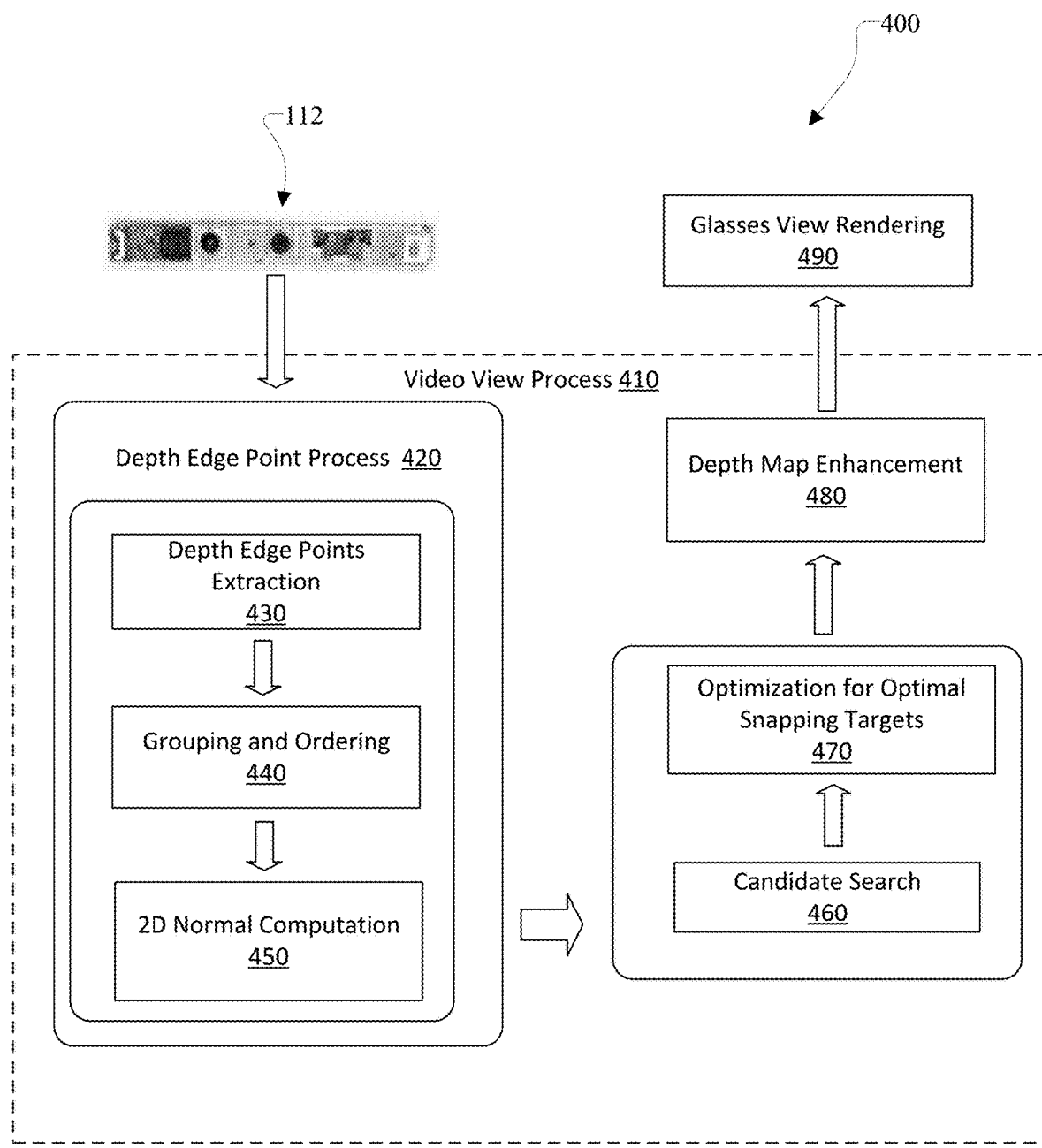
FIG. 4 is a block diagram of a process of the system of FIG. 1 according to an example embodiment of this disclosure.

FIG. 4 is a block diagram of a process 400 of the system 100 according to an example embodiment. In an example embodiment, upon receiving depth data and video data from the RGB-D camera 112, the process 400 includes at least a video view process 410 and a glasses view rendering process 490. In this regard, the process 400 is performed when the processing system 132 executes computer-readable data (e.g., computer-executable data), which is stored on non-transitory computer readable media via the dynamic occlusion handling module 130, the computer readable media 126, or a combination thereof. Generally, the computer executable data can include various instructions, data structures, applications, routines, programs, modules, procedures, other software components, or any combination thereof.

In an example embodiment, the process 400 leverages instances in which boundaries in raw depth maps are normally reasonably close to their counterparts in the corresponding color images, where the image gradients are typically high. In an example embodiment, the process 400 includes snapping at least one depth edge point towards its desired target location. In this regard, based on the above, the process 400 includes discretizing the solution space by constraining the target position of the depth edge point to be on a local line segment and then find an optimal solution for the entire set of depth edge points via discrete energy minimization.

In an example embodiment, the process 400 includes a video view process 410 and a glasses view rendering process 490, as shown in FIG. 4. In an example embodiment, the video view process 410 includes a depth edge point process 420, a candidate search process 460, an optimization process 470, and a depth map enhancement process 480. In an example embodiment, the depth edge point process 420 includes depth edge point extraction 430, grouping and ordering 440, and 2D normal computations 450. More specifically, in an example embodiment, the process 400 includes extracting depth edge points from a depth map and computing smooth 2D normal directions with respect to the extracted depth edge points. In this regard, each 2D normal segment or line defines a solution space for a corresponding edge point, i.e. candidates for each edge point are searched only along this normal direction. In an example embodiment, after the candidate search process 460, the process 400 includes an optimization process 470 based on the results of the candidate search 460 to locate and utilize optimal snapping targets. In this regard, for instance, the optimization process 470 includes defining energy functions in a solution space that includes at least a data term and a smoothness term. Also, in this case, the optimization process 470 includes performing energy minimization efficiently via dynamic programming to identify the optimal target position for each edge point. In an example embodiment, the process 400 includes a depth map enhancement process 480, which is based on an output of edge-snapping. Upon enhancing the depth map, the process 400 switches from the video view process 410 to the glasses view rendering process 490.

Figure 5:
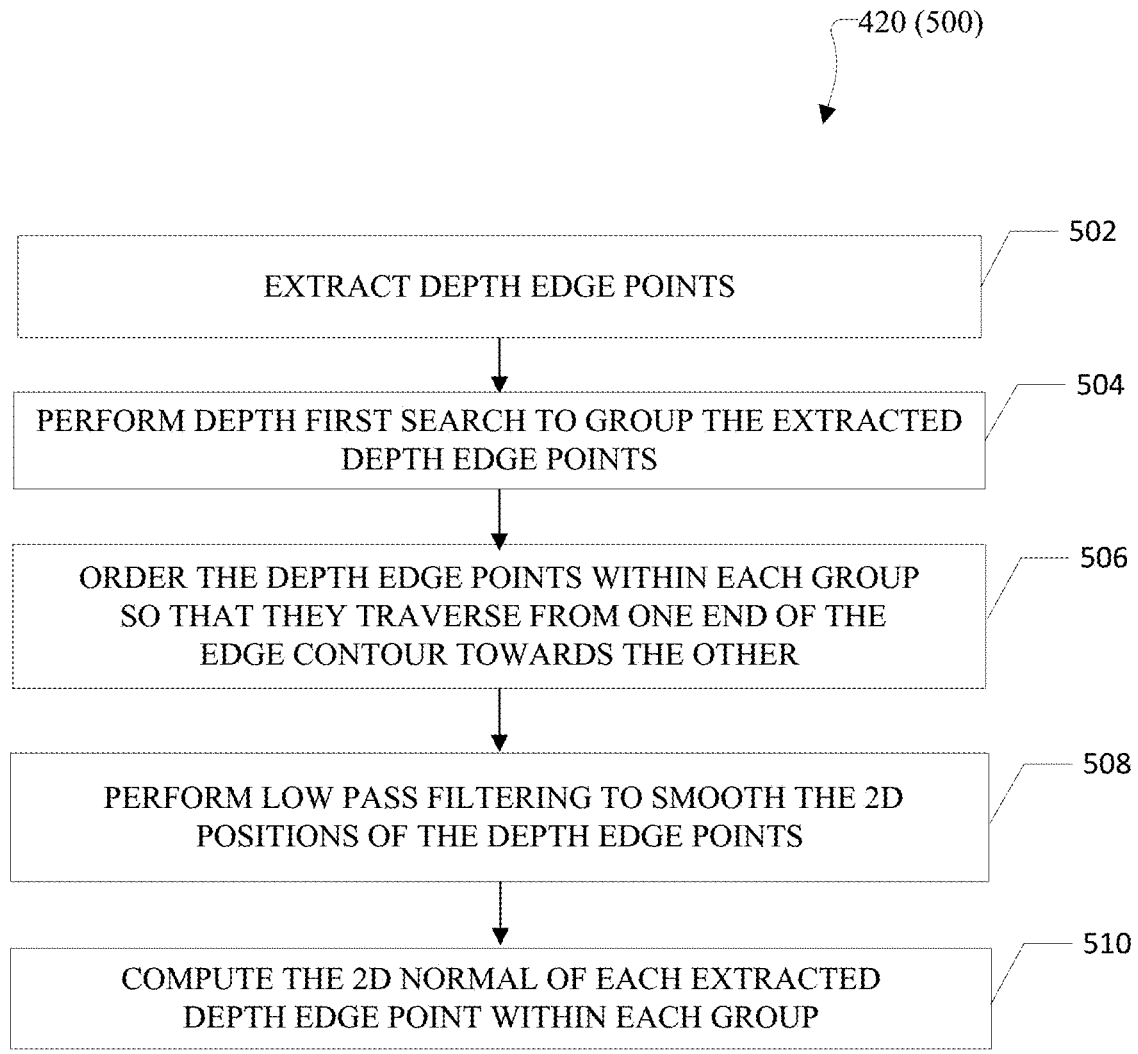
FIG. 5 is a flow diagram of an example implementation of the depth edge point process according to an example embodiment of this disclosure.

FIG. 5 is a flow diagram of a depth edge point process 420 according to an example embodiment. In an example embodiment, the depth edge point process 420 is configured to extract depth edge points from depth points (or pixels) with valid depth values. In addition, the depth edge point process is configured to perform a number of operations in preparation for the candidate search process 460 and optimization process 470. More specifically, an example implementation 500 of the depth edge point process 420 is discussed below.

At step 502, the processing system 132 is configured to extract depth edge points. In an example embodiment, for instance, the depth edge points are those points whose local neighborhood exhibits large depth discontinuity. In this regard, for instance, the processing system 132 primarily or only considers depth points (or pixels) with valid depth values. For each of these pixels, a 3×3 local patch is examined. If any of the four-neighbor pixels either has an invalid depth value or has a valid depth value that differs from the center pixel beyond a certain value, then this center pixel is considered to be a depth edge point. As an example, the raw depth map normally could contain some outliers as isolated points or a very small patch. To remove the effect of these outliers, the processing system 132 is configured to apply a morphological opening, i.e. erosion followed by dilation, to the depth map mask before extracting the depth edge points.

At step 504, the processing system 132 is configured to perform a depth first search on each image group to group the extracted depth edge points. During the depth first search, two depth edge points are considered connected only when one is in the 3×3 neighborhood of the other and the depth difference between these two depth points (or pixels) is less than a certain threshold τmax.

At step 506, the processing system 132 is configured to order the depth edge points of each group so that they traverse from one end of the edge contour towards the other, as required by some of other processes (e.g., the optimization process 470). In some cases, such as when an edge contour is a cyclic contour, the processing system 132 is configured to select one of the depth edge points as the starting point, wherein the selection can be performed at random or by any suitable selection method. In an example embodiment, the following operations in the remainder of this discussion of FIG. 5 are performed for each group of depth edge points separately. Meanwhile, FIG. 6C shows an example containing multiple groups of depth edge points.

At step 508, the processing system 132 is configured to perform low pass filtering on the raw depth edge points to smooth the 2D positions of these depth edge points. More specifically, due to zigzag pattern or unevenness of the raw depth edges, the normal directly computed from these raw depth edge points may suffer from substantial artifacts. In contrast, with low pass filtering, the processing system 132 is configured to reduce noise and artifacts by utilizing these smoothed depth edge points at step 510.

At step 510, the processing system 132 is configured to compute the 2D normal of these depth edge points. In an example embodiment, the processing system 132 is configured to compute the 2D normal of each depth edge point using two neighboring points. In an example embodiment, the processing system 132 utilizes the smoothed depth edge points only for the 2D normal computation, while relying on the raw depth edge points for all (or most) of the later processing.

Figure 6A:
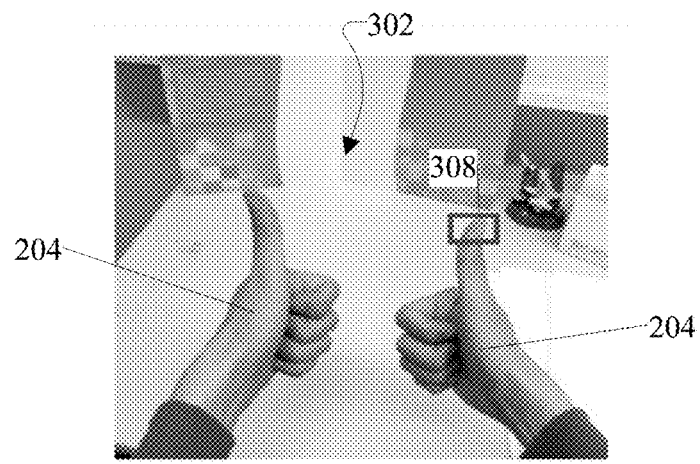
FIG. 6A is an example of a color image according to an example embodiment of this disclosure.
Figure 6B:
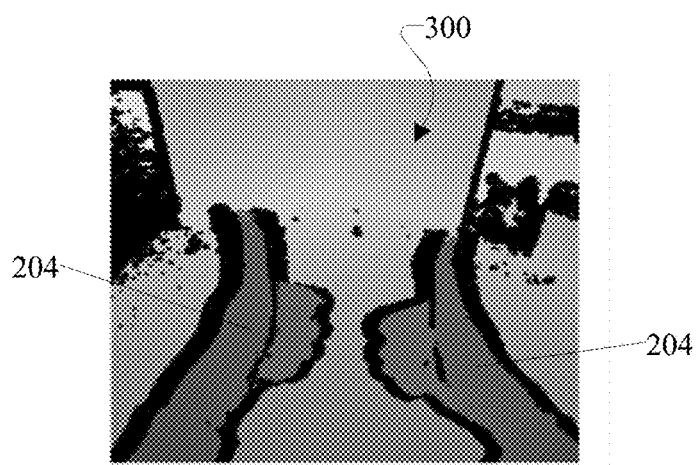
FIG. 6B is an example of a depth map according to an example embodiment of this disclosure.
Figure 6C:
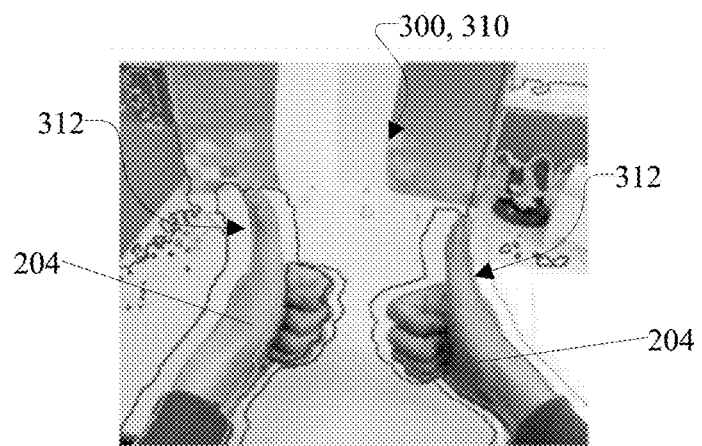
FIG. 6C is an example of depth edge points, which overlay a gray-scale image, according to an example embodiment of this disclosure.
Figure 6D:
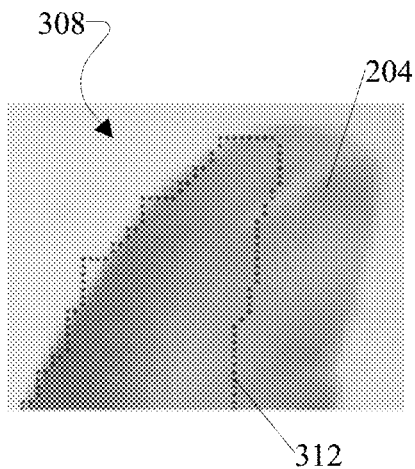
FIG. 6D is an enlarged view of raw depth edge points within an exemplary region of FIG. 6C according to an example embodiment of this disclosure.
Figure 6E:
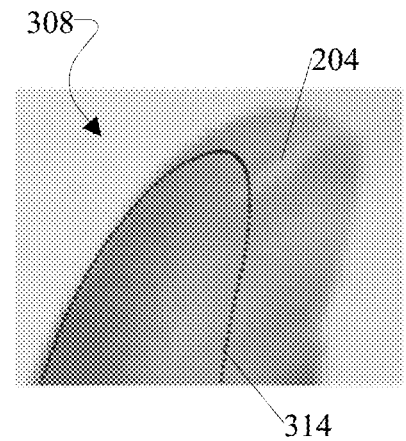
FIG. 6E is an enlarged view of smoothed depth edge points of a region of FIG. 6C according to an example embodiment of this disclosure.
Figure 6F:
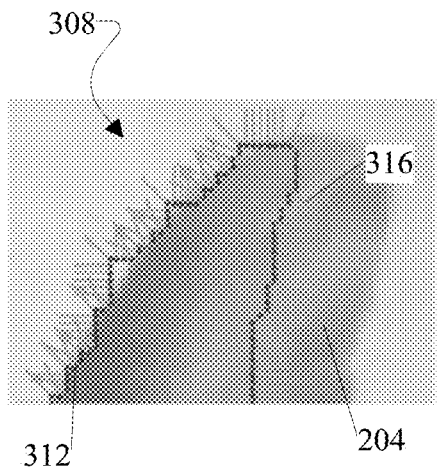
FIG. 6F illustrates an example of 2D-normals that are generated based on the raw depth edge points of FIG. 6D according to an example embodiment of this disclosure.
Figure 6G:
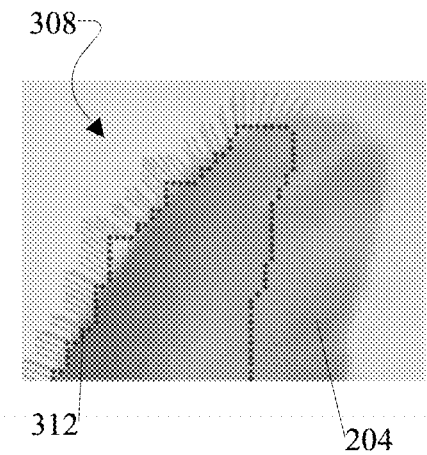
FIG. 6G illustrates an example of 2D-normals that are generated based on the smoothed depth edge points of FIG. 6E according to an example embodiment of this disclosure.

FIGS. 6A-6G illustrate certain aspects of the example implementation 500 of the depth edge point processing according to an example embodiment. Specifically, FIG. 6A illustrates an example of a color image 302 from the RGB-D camera 112. FIG. 6B illustrates an example of a raw depth map 300 from the RGB-D camera 112. FIG. 6C illustrates examples of raw depth edge points 312, which overlay a gray-scale image 310. Meanwhile, FIGS. 6D-6G illustrate enlarged views of portions of FIG. 6C that correspond to the boxed region 308 of FIG. 6A. In this regard, FIG. 6D illustrates the raw depth edge points 312 associated with a boundary of a thumb of the user's hand 204 while FIG. 6E illustrates smoothed depth edge points 314. In addition, FIG. 6F illustrates 2D normals 316 that are generated based on the raw depth edge points 312. In contrast, FIG. 6G illustrates 2D normals 316 that are generated based on the smoothed depth edge points. As shown, the 2D-normals of the smoothed depth edge points in smoothed depth edge points in FIG. 6G carry less noise than that of the raw depth edge points FIG. 6F.

Figure 7:
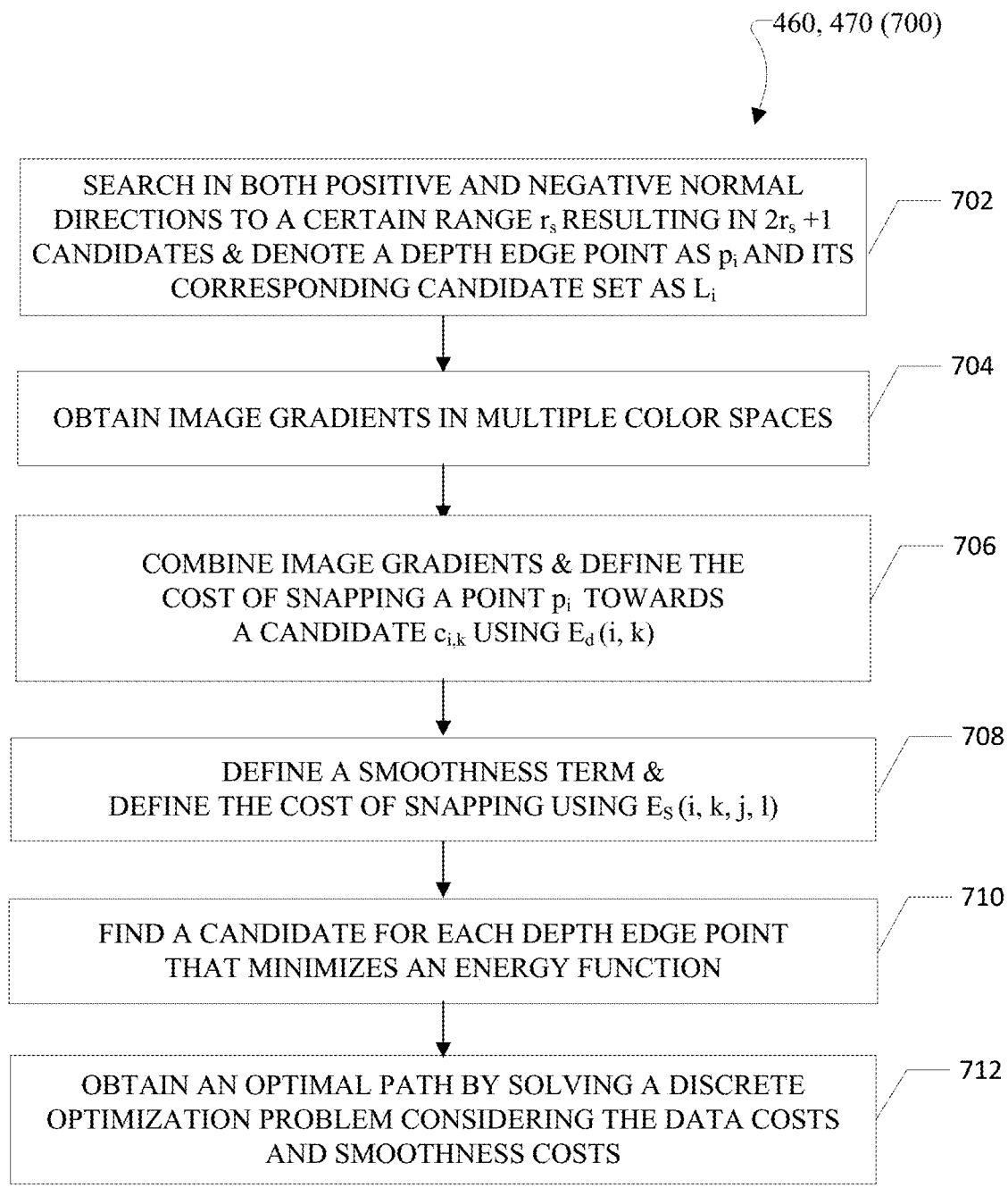
FIG. 7 is a flow diagram of an example implementation of the candidate search process and the optimization process according to an example embodiment of this disclosure.

FIGS. 7, 8A-8C, 9A-9C, 10A-10C, and 11A-11C relate to the candidate search process 460 and the optimization process 470. More specifically, FIG. 7 is a flow diagram of an example implementation 700 of the candidate search process 460 and the optimization process 470 according to an example embodiment. Meanwhile, FIGS. 8A-8C, 9A-9C, 10A-10C, and 11A-11C illustrate various aspects of the candidate search process 460 and the optimization process 470.

At step 702, in an example embodiment, the processing system 132 searches for candidates for each depth edge point. In this regard, for instance, the solution space of snapping each depth edge point is constrained to the line of its 2D normal. Since there is no prior information as to which direction is the target direction, the processing system 132 is configured to search in both the positive and negative normal directions to a certain range $r_s$, resulting in $2r_s+1$ candidates. Also, in an example embodiment, the processing system 132 is configured to denote a depth edge point as $p_i$ and its corresponding candidate set as $L_i=\{c_{i,k}|k=1, \ldots, 2r_s+1\}$.

At step 704, in an example embodiment, the processing system 132 obtains the image gradients using a Sobel operator in multiple color spaces. In an example embodiment, the first part of the image gradients is computed directly in the RGB color space by the following equation:

$$[g^{rgb}]=[g^{rx}g^{ry}g^{gx}g^{gy}g^{bx}g^{by}] \quad \text{[Equation 1]}$$

As indicated above, this equation contains image gradients along both x and y directions. However, in some cases, the image gradients in the RGB color space are not necessarily high along some object boundaries. Thus, in an example embodiment, the processing system 132 is configured to enhance the discriminant power by incorporating image gradients from the YCbCr space as indicated by the following equation:

$$[g^{cbcr}]=[g^{cbx}g^{cby}g^{crx}g^{cry}] \quad \text{[Equation 2]}$$

At step 706, in an example embodiment, the processing system 132 combines these image gradients and defines the cost of snapping a point $p_i$ towards a candidate $c_{i,k}$ as follows:

$$E_d(i,k) = \exp\left\{-\frac{w^{rgb}\|g^{rgb}(c_{i,k})\|^2 + w^{cbcr}\|g^{cbcr}(c_{i,k})\|^2}{\sigma_g^2}\right\} \quad \text{[Equation 3]}$$

where $w^{rgb}$ and $w^{cbcr}$ are the weights of different color space gradients.

As indicated above, encoding image gradients from multiple color spaces provides a number of advantages. For example, combining different color spaces generally provides more discriminating power for this edge-snapping framework. For instance, in some cases, the RGB color space alone might not be sufficient. In this regard, turning to FIGS. 9A-9C, as an example, the boundaries of the fingertips, as shown in the circled regions 328, do not have a strong image gradient in the RGB space. In this case, when involving only the RGB color space, there are some edge points associated with these fingertips that cannot be snapped to the desired locations. In contrast, when the YCbCr space is incorporated with the RGB space, the processing system 132 is configured to achieve snapping results, which are improved compared to those snapping results, which involve only the RGB space. In many AR use cases, there are scenes in which a user interacts with at least one virtual object 202. In such cases, the incorporation of the YCbCr color space is particularly suitable for differentiating skin color associated with a user from other colors (e.g., non-skin colors). Also, in other example embodiments, other color spaces can be used. For instance, the hue channel of an HSV color space can be used. Moreover, although this example embodiment uses RGB and YCbCr spaces, other example embodiments include various combinations of various color spaces.

At step 708, in an example embodiment, the processing system 132 defines a smoothness term to penalize a large deviation between neighboring depth edge points (or depth edge pixels). In this regard, to achieve smooth snapping, the processing system 132 snaps neighboring depth edge points to locations that are relative close to each other and/or not far away from each other. For instance, in an example embodiment, for a pair of consecutive depth edge points $p_i$ and $p_j$, the processing system 132 computes the cost of snapping pi onto $c_{i,k}$ and $p_j$ onto $c_{j,l}$ via the following equation:

$$E_s(i,k,j,l) = \begin{cases} \infty, & |k-l| \geq d_{max} \\ \|c_{i,k} - c_{j,l}\|^2, & \text{otherwise} \end{cases} \quad \text{[Equation 4]}$$

In this equation, the parameter $d_{max}$ defines the maximal discrepancy allowed for two consecutive depth edge points.

At step 710, in an example embodiment, the processing system 132 determines or finds a candidate for each depth edge point to minimize the following energy function:

$$E=\Sigma_i E_d(i,k)+\lambda_s \Sigma_{i,j} E_s(i,k,j,l), \quad \text{[Equation 5]}$$

where $\lambda s$ leverages the importance of the smoothness constraint. In an example embodiment, this class of discrete optimization problem is solved in an efficient manner via dynamic programming, which identifies an optimal path in the solution space.

At step 712, the processing system 132 determines an optimal path by solving the discrete optimization problem considering the data costs and smoothness costs. Specifically, the processing system 132 constructs a matrix H of dimension N×($2r_s+1$) where N is the number of depth edge points. The entries are initialized with the data term $H(i,k)=E_d(i,k)$. The processing system 132 then traverses from the first depth edge point toward the last depth edge point, and updates the matrix via the following equation:

$$H(i+1,l)=H(i+1,l)+\min_k\{H(i,k)+E_s(i,k,i+1,l)\} \quad \text{[Equation 6]}$$

In an example embodiment, as discussed above, the processing system 132 provides this update to find the optimal path from point i to point i|1, considering both the data costs and the smoothness costs. In an example embodiment, this operation is performed for all the candidates l=1, . . . , $2r_s+1$ and for all depth edge points sequentially. Generally, the k that gives the minimum of the second term is the best candidate that connects $p_i$ with $p_{i|1}$ if candidate l is selected for $p_{i+1}$ and is recorded during the update. When the update is finished, i.e. reaching the last edge point, the processing system 132 selects the candidate that gives minimal cost for the last point. In an example embodiment, the processing system 132 then traverses back to locate the best candidates for a previous point given the decision for the current point, which was recorded earlier during the update. In an example embodiment, the processing system 132 continues this procedure until the first point is reached where the optimal path is found. In this regard, the optimal path provides a target position to snap for each edge point.

Figure 8A:
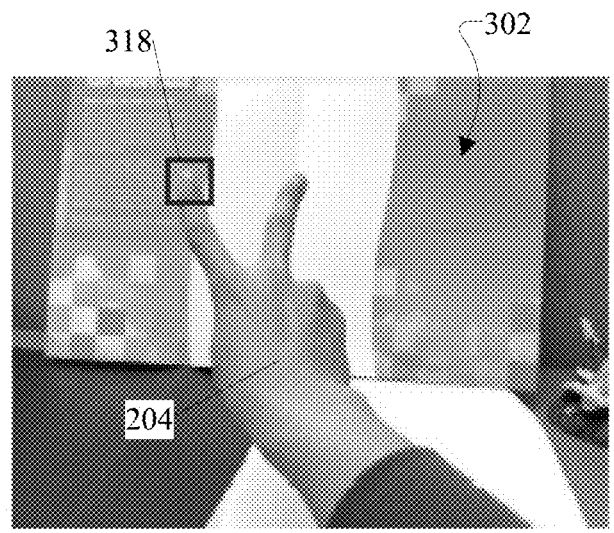
FIG. 8A is an example of a color image according to an example embodiment of this disclosure.
Figure 8B:
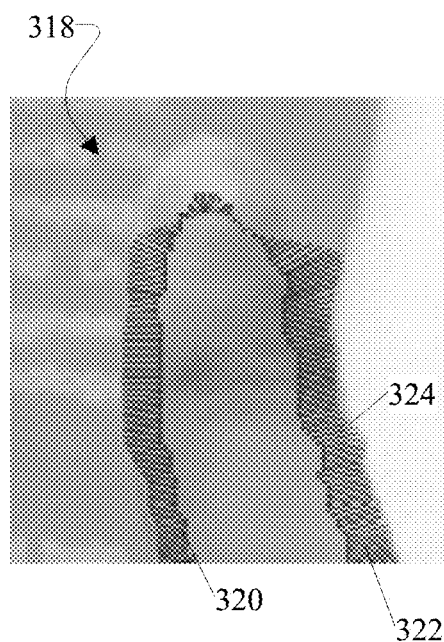
FIG. 8B is an enlarged view of a region of FIG. 8A along with a visualization of edge-snapping with image gradients from the RGB space according to an example embodiment of this disclosure.
Figure 8C:
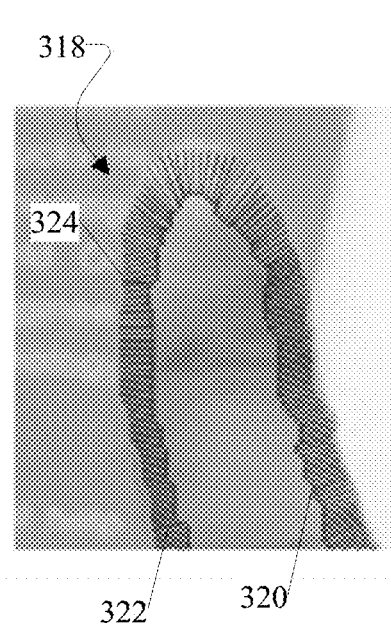
FIG. 8C is an enlarged view of a region of FIG. 8A along with a visualization of edge-snapping with image gradients from both the RGB space and the YCbCr space according to an example embodiment of this disclosure.

FIGS. 8A-8C illustrate at least one benefit associated with using image gradients from multiple color spaces. In this regard, FIG. 8A is a non-limiting example of a color image 302. Meanwhile, each of FIGS. 8B and 8C illustrate an enlarged view of the boxed region 318 of FIG. 8A. FIGS. 8B and 8C include the raw depth edge points 320 and their target positions 324 after the optimization process 470. In addition, FIGS. 8B and 8C also include the paths 322, which show the movements of the raw depth edge points 320 to their corresponding target positions 324. More specifically, FIG. 8B shows the results obtained by only using the image gradient in the RGB space. In contrast, FIG. 8C shows the result obtained by combining image gradients from both the RGB space and the YCbCr space. In this regard, the fusion of multiple color spaces, as shown in FIG. 8C, improves the robustness of the edge-snapping framework compared to that of a single color space, as shown in FIG. 8B.

Figure 9A:
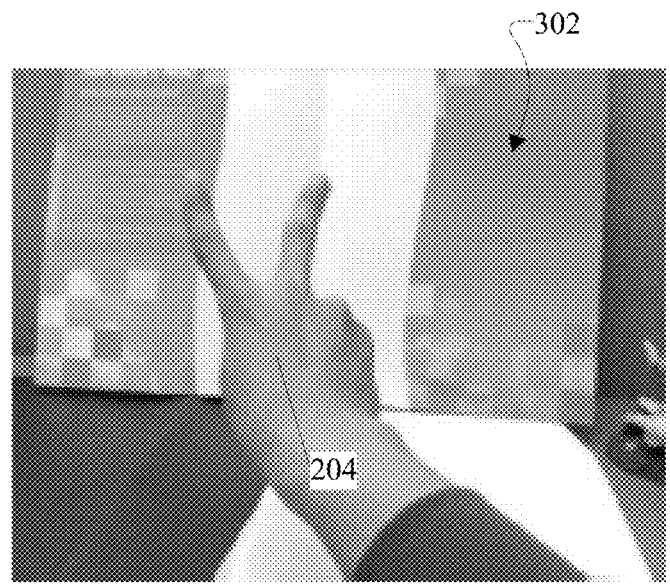
FIG. 9A is an example of a color image according to an example embodiment of this disclosure.
Figure 9B:
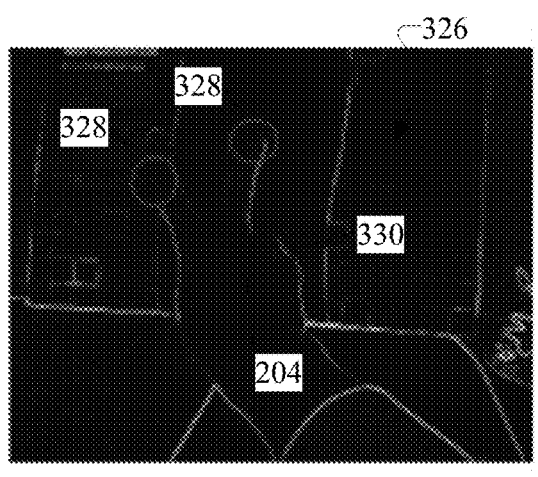
FIG. 9B is an example of the magnitude of image gradients from a red channel according to an example embodiment of this disclosure.
Figure 9C:
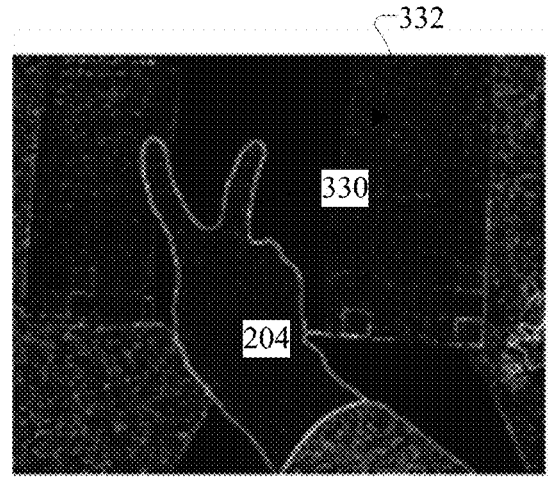
FIG. 9C is an example of the magnitude of image gradients in a converted $C_R$ channel according to an example embodiment of this disclosure.

FIGS. 9A-9C illustrate at least one other benefit associated with using image gradients from multiple color spaces. Specifically, FIG. 9A illustrates a non-limiting example of a color image (or raw RGB data), as obtained from the RGB-D camera 112. FIG. 9B is a non-limiting example of the magnitude of image gradients from the red channel 326. In this example, the circled regions 328 highlight instances in which the image gradients of the object boundary 330 of the user's hand 204 are relatively low in the RGB space. FIG. 9C is a non-limiting example of the magnitude of image gradients in a converted $C_R$ channel 332, where the object boundary 330 of the user's hand 204, particularly at the fingertips, are more visible.

Figures 10A, 10B, 10C:
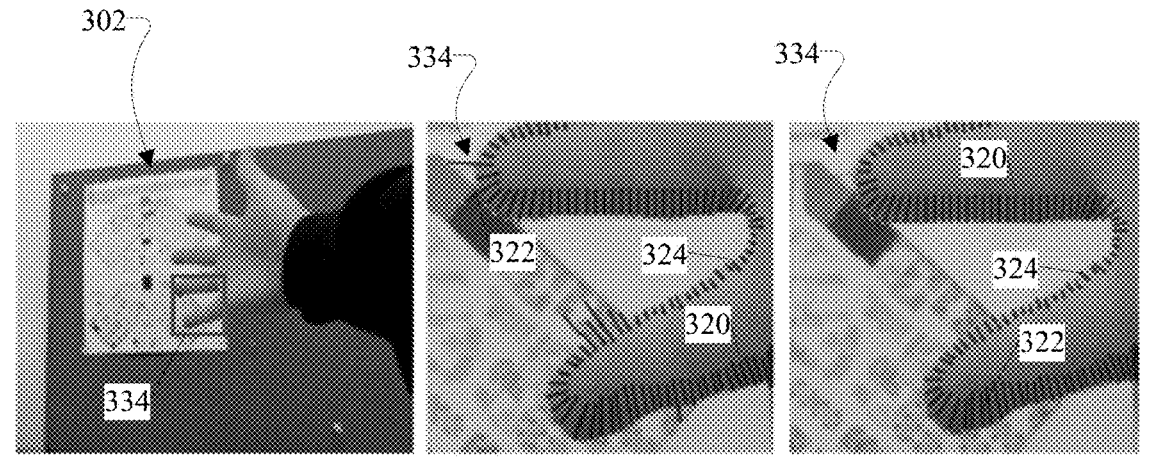
FIG. 10A is an example of a color image according to an example embodiment of this disclosure.
FIG. 10B illustrates an example of edge-snapping results for a region of FIG. 10A without a smoothness constraint according to an example embodiment of this disclosure.
FIG. 10C illustrates an example of edge-snapping results for a region of FIG. 10A with a smoothness constraint according to an example embodiment of this disclosure.

FIGS. 10A-10C illustrate a number of benefits associated with applying smoothness terms. FIG. 10A illustrates a non-limiting example of a color image 302. Meanwhile, FIGS. 10B and 10C are enlarged views of the boxed region 334 of FIG. 10A. More specifically, FIG. 10B illustrates the edge-snapping results without a smoothness constraint. In contrast, FIG. 10C illustrates the edge-snapping results with at least one smoothness constraint. FIGS. 10B and 10C include the raw depth edge points 320 and their target positions 324. In addition, FIGS. 10B and 10C also include the paths 322, which show the movements of the raw depth edge points 320 to their corresponding target positions 324. In this regard, the results provided with smoothness constraints, as shown in FIG. 10C, provide greater edge-snapping accuracy compared to that without smoothness constraints, as shown in FIG. 10B.

Figures 11A, 11B, 11C:
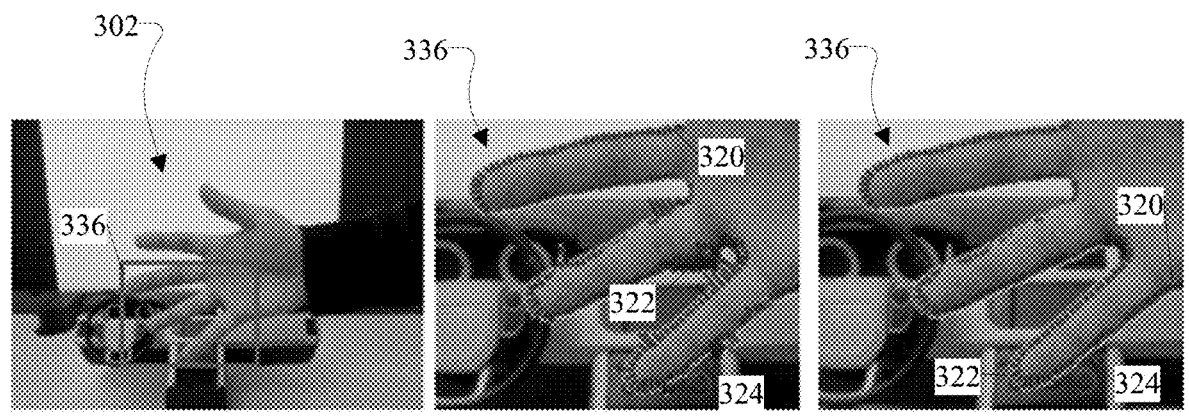
FIG. 11A is an example of a color image according to an example embodiment of this disclosure.
FIG. 11B illustrates an example of edge-snapping results for an exemplary region of FIG. 11A without a smoothness constraint according to an example embodiment of this disclosure.
FIG. 11C illustrates an example of edge-snapping results for an exemplary region of FIG. 11A with a smoothness constraint according to an example embodiment of this disclosure.

FIGS. 11A-11C illustrate a number of benefits of applying smoothness terms. FIG. 11A illustrates a non-limiting example of a color image 302. Meanwhile, FIGS. 11B and 11C are enlarged views of the boxed region 336 of FIG. 11A. FIG. 11B illustrates the edge-snapping results without a smoothness constraint. In contrast, FIG. 11C illustrates the edge-snapping results with at least one smoothness constraint. FIGS. 11B and 11C include the raw depth edge points 320 and their target positions 324. In addition, FIGS. 11B and 11C also include the paths 322, which show the movements of the raw depth edge points 320 to their corresponding target positions 324. In this regard, the results provided with smoothness constraints, as shown in FIG. 11C, provides better edge-snapping accuracy compared to that without smoothness constraints, as shown in FIG. 11B.

Without the smoothness term, the process 400 will basically use the "winner takes all" strategy in that the candidate with the highest image gradient is selected as the target position for each depth edge point. However, when a background scene has some strong edges, this "winner takes all" strategy for selecting target positions will result in various artifacts. In this regard, for instance, FIGS. 10B and 11B illustrate examples in which some depth edge points were snapped to undesirable positions having high image gradients. In contrast, the inclusion of the smoothness term within the process 400 can effectively prevent such artifacts from occurring, as shown in FIGS. 10C and 11C.

Figure 12:
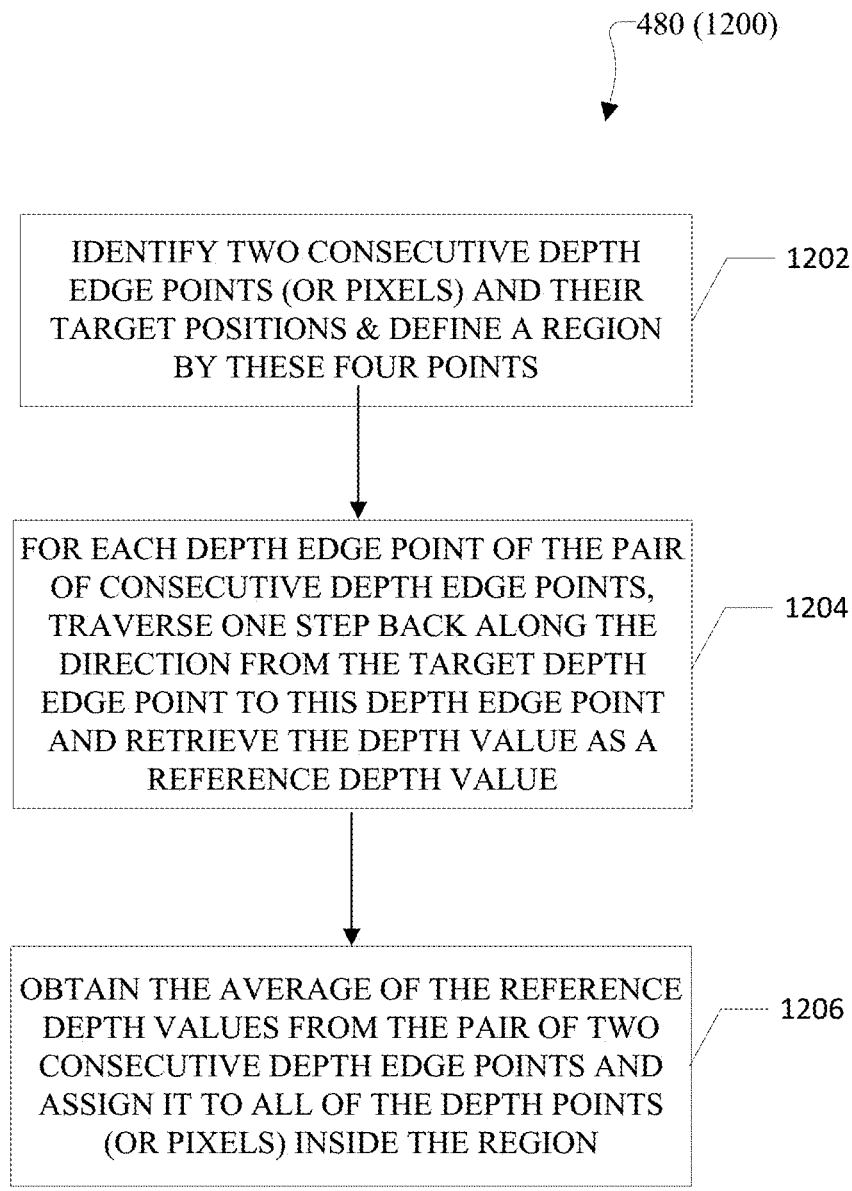
FIG. 12 is a flow diagram of an example implementation of the depth map enhancement process according to an example embodiment of this disclosure.
Figures 13A, 13B, 13C, 13D, 13E:
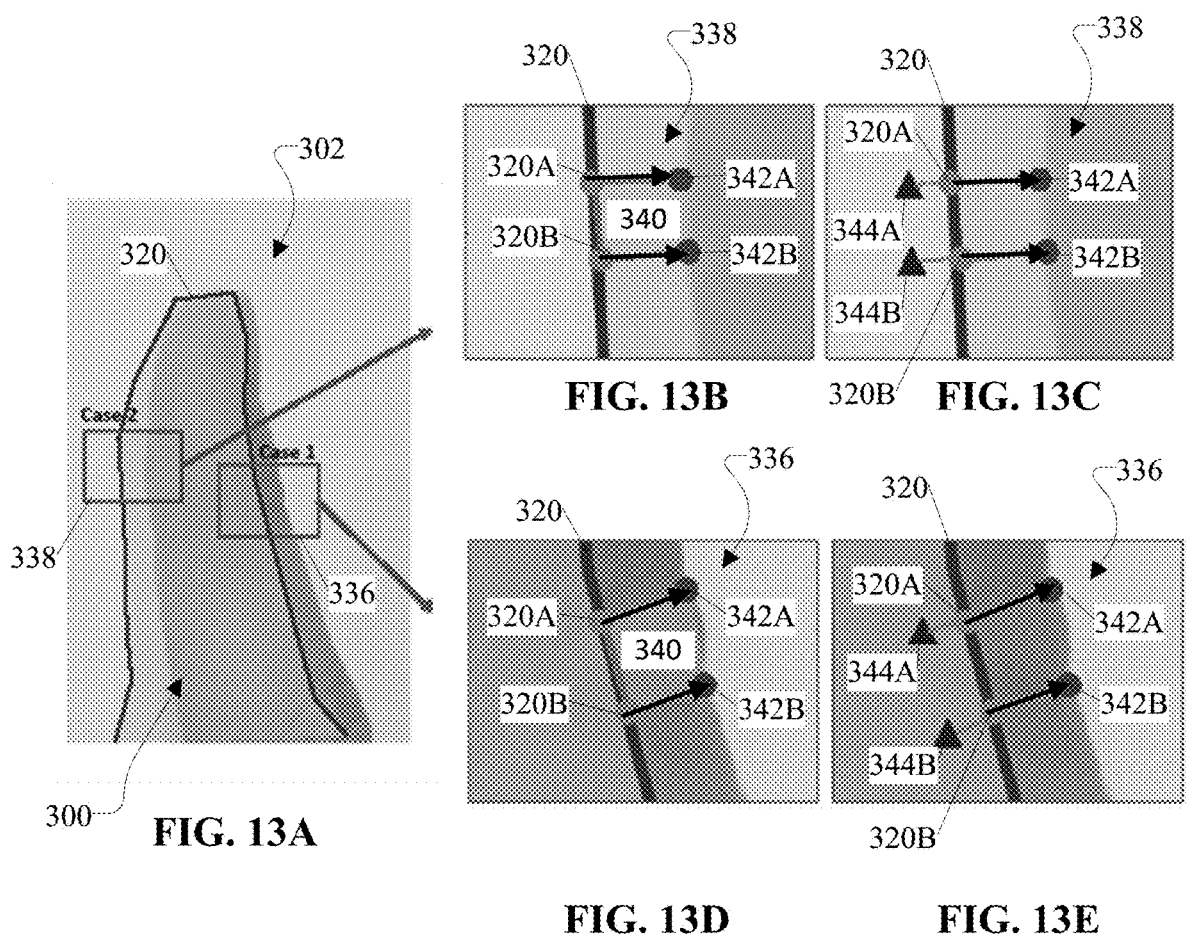
FIGS. 13A, 13B, 13C, 13D, and 13E illustrate aspects of the depth map enhancement process based on edge-snapping according to an example embodiment of this disclosure.

FIGS. 12 and 13A-13E relate to the depth map enhancement process 480. Specifically, FIG. 12 is a flow diagram of an example implementation 1200 of the depth map enhancement process 480 according to an example embodiment. In addition, FIGS. 13A-13E illustrate depth map enhancement based on edge-snapping. More specifically, each of FIGS. 13A-13E illustrate a depth map 300 overlaying a color image 302. Also, in each of FIGS. 13A-13E, the curve 320 represents a boundary of a thumb from the user's hand 204, as taken from the depth map 300. In this example, the shaded region 340, bounded by at least the curve 318, has valid depth measurements while the remaining regions have zero depths. FIGS. 13B-13E also illustrate depth edge points 320A and 320B (as taken from curve 320) and their corresponding target positions 342A and 342B. Also, the points 344A and 344B, illustrated as triangles in FIGS. 13C and 13E, represent the depth points (or pixels), which are used for retrieving reference depth values. That is, FIGS. 13A-13E illustrate examples of certain aspects of the example implementation 1200, as discussed below.

At step 1202, in an example embodiment, the processing system 132 considers two consecutive depth edge points 320A and 320B as well as their target positions 342A and 342B, which form a quadrilateral as illustrated by the shaded region 340 in each of FIGS. 13B and 13D. In an example embodiment, the processing system 132 processes all of the depth points (or pixels) inside this quadrilateral (or the shaded region 340) for enhancement. In an example embodiment, this processing is performed for each pair of consecutive depth edge points 320A and 320B. Essentially, each depth point (or pixel) inside the quadrilateral (or the shaded region 340) has incorrect depth measurements due to sensor noises. In an example embodiment, the true depth of each of these points (or pixels) is recovered. However, such an example embodiment could involve significantly complicated operations and be computationally expensive, but might not be necessary for achieving visually pleasing dynamic occlusion effects. Therefore, in another example embodiment, the processing system 132 is configured to perform an approximation to estimate reasonable depth values for these depth points (or pixels) that are generally sufficient.

In general, there are typically two types of errors for the depth points (or pixels) in the regions, as shown in FIGS. 13A-13E. For example, the first type of error ("case 1") includes at least one missing value, where the object boundaries of the depth map 300 are generally inside the object, as shown within the boxed region 336 of FIG. 13A. Another type of error ("case 2") occurs when depth points (or pixels) belonging to an object further away are labeled with depth values from the occluding object, as shown within the boxed region 338 of FIG. 13A. In both of these cases, the processing system 132 implements the following same methodology to modify the depth values.

At step 1204, in an example embodiment, for each depth edge point (or pixel) of the pair of consecutive depth edge points 320A and 320B, the processing system 132 traverses one step back along the direction from the target to this pixel and retrieves the depth value as a reference depth value. Examples of these reference pixels are represented by the black triangles 344 in FIGS. 13C and 13E, respectively.

At step 1206, in an example embodiment, the processing system 132 then takes the average of the reference depth values from the pair and assigns it to all of the depth points (or pixels) inside the region. As illustrated in FIG. 13A, for case 1, the reference values are taken from a region inside the finger. Therefore, the target region 340 will be filled in with some depth from the finger, resulting in filling effects for the missing values. For case 2 in FIG. 13A, the reference values will be zero and the target region will be replaced with zero depth resulting in this piece being removed. With this single procedure, the processing system 132 achieves both effects, as desired. When considering speed, this approximation is sufficient for dynamic occlusion handling. However, in an alternative example embodiment, the processing system 132 is configured to implement an extrapolation process to estimate the depth values.

In an example embodiment, the depth map enhancement process 480 is highly parallel. Accordingly, with regard to the processing system 132, the CPU, the GPU, or a combination thereof can perform the depth map enhancement process 480. In an example embodiment, the edge-snapping moves the depth edge points 320A and 320B in directions towards their target positions 342A and 342B. In an example embodiment, the processing system 132 is configured to process all or substantially all of the depth points (or pixels) that fall within the regions of the edge-snapping. After the depth map enhancement process 480, the process 400 includes a glasses view rendering process 490.

Figure 14:
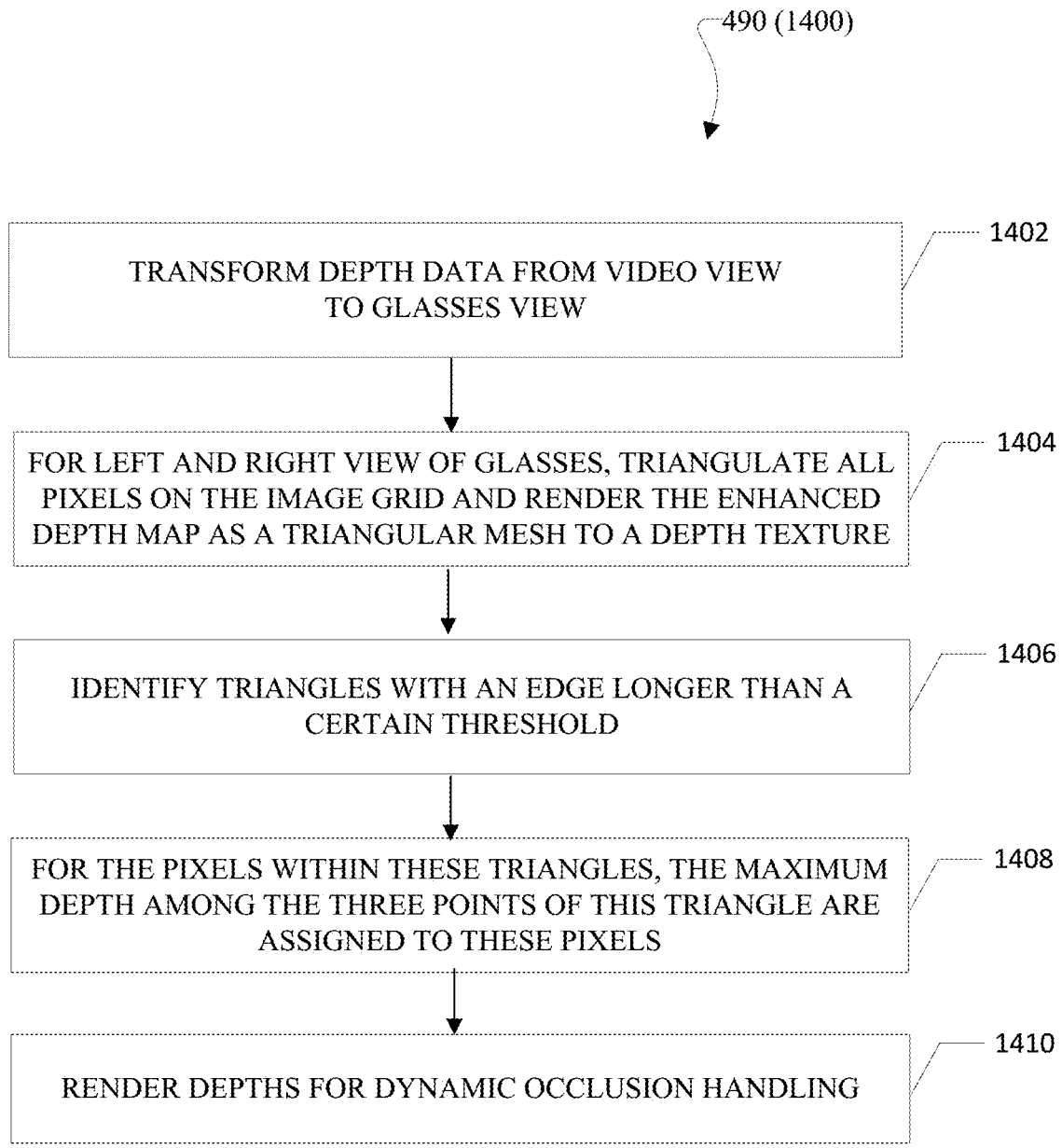
FIG. 14 is a flow diagram of an example implementation of the glasses view rendering process according to an example embodiment of this disclosure.

FIGS. 14 and 15A-15C relate to the glasses view rendering process 490, which is configured to achieve dynamic occlusion effects in the glasses view 212. Specifically, FIG. 14 is a flow diagram of an example implementation 1400 of the glasses view rendering process 490 according to an example embodiment. In an example embodiment, the CPU, the GPU, or a combination thereof can perform this example implementation 1400. For instance, in an example embodiment, for speed, the GPU of the processing system 132 is configured to perform the glasses view rendering process 490. In addition, FIGS. 15A-15C illustrate examples of certain aspects of the example implementation 1400.

At step 1402, in an example embodiment, the processing system 132 transforms the depth data from the video view 200 to the glasses view 212. In an example embodiment, for instance, the transformation is obtained via calibration using software technology for AR applications, such as ARToolKit or other similar software programs. Due to the differences between the video view 200 and the glasses view 212, empty regions (holes) might be created as illustrated in FIG. 15A. Here the curve 1500 represents the object surface. Also in FIG. 15A, point p1 and point p2 are on the surface that projects to nearby points in video view 200, and p1 is further than p2. In glasses view 212, due to this view change, the point (or pixel) nearby p2 follows the ray R, for which there is no direct depth measurement in this case. One way to obtain the depth is via interpolation between point p1 and point p2, ending up with the point p4. However, this interpolation might be problematic for occlusion handling. In this regard, for instance, when a virtual object 202 is placed in a position, as shown in FIG. 15B, point p4 will occlude the virtual object 202. Essentially, in this case, there is no information regarding the true depth along the ray R without any prior information. A safer way, which is also used for view synthesis, is to take the larger depth between point p1 and point p2 as the estimation, resulting in point p3 as shown in FIG. 15C. Accordingly, guided by this strategy, the processing system 132 performs a number of operations when transforming the scene depth from video view 200 to the glasses view 212 before depth testing in glasses view 212.

At step 1404, in an example embodiment, the processing system 132 triangulates all or substantially all of the points (or pixels) on the image grid and renders the enhanced depth map as a triangular mesh to a depth texture.

At step 1406, in an example embodiment, during this rendering, the processing system 132 identifies the triangles with an edge longer than a certain threshold. As one non-limiting example, the threshold is 20 mm. In this regard, the points (or pixels) within these triangles correspond to the case illustrated in FIG. 15A.

At step 1408, in an example embodiment, the processing system 132 assigns these points (or pixels) with the maximum depth among the three end points of this triangle.

At step 1410, in an example embodiment, the processing system 132 renders the depths for dynamic occlusion handling. In this regard, for instance, the processing system 132 is configured to implement this process via appropriate software technology, such as OpenGL Shader or any other software program, and apply this process to both the left and right view of the glasses.

As discussed above, the process 400 is configured to leverage the data provided by RGB-D camera 112. More specifically, the dynamic occlusion handling system 120 includes an edge-snapping algorithm that snaps (or moves) an object boundary of the raw depth data towards the corresponding color image and then enhances the object boundary of the depth map based on the edge-snapping results. This edge-snapping is particularly beneficial as the use of raw depth data may include holes, low resolutions, and significant noises around the boundaries, thereby introducing visual artifacts that are undesirable in various applications including AR. The enhanced depth maps are then used for depth testing with the virtual objects 202 for dynamic occlusion handling. Further, there are several AR applications that can benefit from this dynamic occlusion handling. As non-limiting examples, this dynamic occlusion handling can be applied to at least the following two AR use cases.

As a non-limiting example, a first AR use case involves an automotive repair application, where a user uses an AR system for guidance. In this example, the automotive repair application includes an AR scene 600 with a 3D printed dashboard as an example. In addition, the AR scene 600 includes virtual objects 202, specifically a virtual touch screen and a windshield. For evaluation purposes, the following discussion includes positioning a user's hand 204 in different locations of the AR scene 600. In some cases, the user's hand 204 should be occluded by the touch screen but not the windshield; while in others, the user's hand 204 should occlude both virtual objects 202. Some of the example results are shown in FIGS. 16A-16C, 17A-17C, and 18A-18C.

FIGS. 16A-16C, 17A-17C, and 18A-18C illustrate visual results of different occlusion handling strategies in an AR-assisted automotive repair scenario. Specifically, FIGS. 16A-16C illustrate an instance in which the user's hand 204 should reside between two virtual objects 202 (e.g., the virtual touchscreen and the virtual windshield). FIG. 16A illustrates the visual results of virtual objects 202 in relation to the user's hand 204 without any occlusion handling. As shown in FIG. 16A, instead of residing between two virtual objects 202, as desired, the user's hand 204 is improperly occluded by both virtual objects 202. FIG. 16B illustrates the visual results with occlusion handling using raw depth data. As shown in FIG. 16B, the AR scene 600 suffers from defects, such as various visual artifacts, as indicated by the arrows 602. In contrast, FIG. 16C illustrate the visual results of virtual objects 202 with dynamic occlusion handling using an enhanced depth map, as disclosed herein. As shown in FIG. 16C, the AR scene 600 includes a boundary for the user's hand 204, which is better preserved and properly positioned in relation to the virtual objects 202, when dynamic occlusion handling is performed with an enhanced depth map.

FIGS. 17A-17C illustrate an instance in which the user's hand 204 should occlude both virtual objects 202 (e.g., the virtual touchscreen and the virtual windshield). FIG. 17A illustrates the visual results of virtual objects 202 in relation to the user's hand 204, without any occlusion handling. As shown in FIG. 17A, instead of residing in front of the virtual objects 202, as desired, the user's hand 204 is improperly occluded by both virtual objects 202. FIG. 17B illustrates the visual results of the virtual objects 202 in relation to the user's hand 204 with occlusion handling using raw depth data. As shown in FIG. 17B, the AR scene 600 suffers from defects, such as various visual artifacts, as indicated by the arrows 602. In contrast, FIG. 17C illustrate the visual results of the virtual objects 202 in relation to the user's hand 204 with dynamic occlusion handling using an enhanced depth map, as disclosed herein. As shown in FIG. 17C, the AR scene 600 includes a boundary for the user's hand 204, which is better preserved and properly positioned in relation to the virtual objects 202, when dynamic occlusion handling is performed with an enhanced depth map.

FIGS. 18A-18C illustrate instances in which a user's hand 204 should occlude at least two virtual objects 202 (e.g., the virtual touchscreen and the virtual windshield). FIG. 18A illustrates the visual results of virtual objects 202 in relation to the user's hand 204, without any occlusion handling. As shown in FIG. 18A, instead of residing in front of the virtual objects 202, as desired, the finger of the user's hand 204 is improperly occluded by both virtual objects 202. FIG. 18B illustrates the visual results of the virtual objects 202 in relation to the user's hand 204 with occlusion handling using raw depth data. In contrast, FIG. 18C illustrate the visual results of the virtual objects 202 in relation to the user's hand 204 with dynamic occlusion handling using an enhanced depth map, as disclosed herein. As shown in FIG. 18C, the AR scene 600 includes a boundary for the user's hand 204, which is better preserved and properly positioned in relation to the virtual objects 202, when dynamic occlusion handling is performed with an enhanced depth map.

As another non-limiting example, a second AR use case involves AR gaming. For instance, in a treasure hunting game with an AR system, the real scene serves as the playground while the virtual treasure chest is a virtual object 202 hidden somewhere in the real scene. More specifically, in this example, the virtual treasure chest is hidden behind a closet door 606 and behind a box 604. Therefore, in this AR scene 600, to be able to find the hidden virtual treasure chest, the user should open the closet door 606 and remove the box 604.

However, in this treasure hunting game, without the appropriate dynamic occlusion handling, the virtual treasure chest will be visible to the user, ruining the entire gaming experience of finding the hidden virtual treasure chest. Using the raw depth data from the depth sensor, reasonable occlusion handling effects can be achieved. However, visual artifacts can also be observed in this AR scene 600 when raw depth data is used. Due to the occlusion between the closet door 606 and the box 604, there are normally missing depth values along the boundaries. As the user opens the closet door 606, visual artifacts can be observed. In contrast, by using dynamic occlusion handling with enhanced depth maps via the process 400, the boundaries of the closet door 606 and the box 604 are snapped to their desired locations and the visual artifacts are removed.

Figures 19A, 19B, 19C:
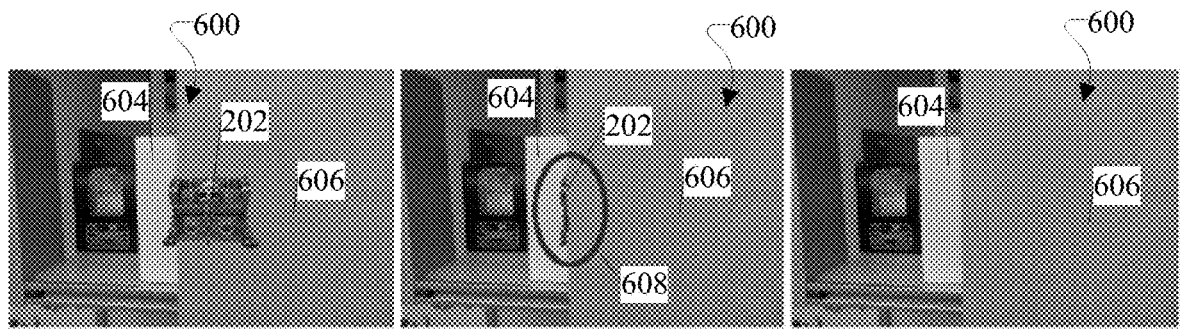
FIG. 19A is an example of an AR scene without dynamic occlusion handling.
FIG. 19B is an example of an AR scene with dynamic occlusion handling using raw depth data according to an example embodiment of this disclosure.
FIG. 19C is an example of an AR scene with dynamic occlusion handling using an enhanced depth map according to an example embodiment of this disclosure.
Figures 20A, 20B, 20C:
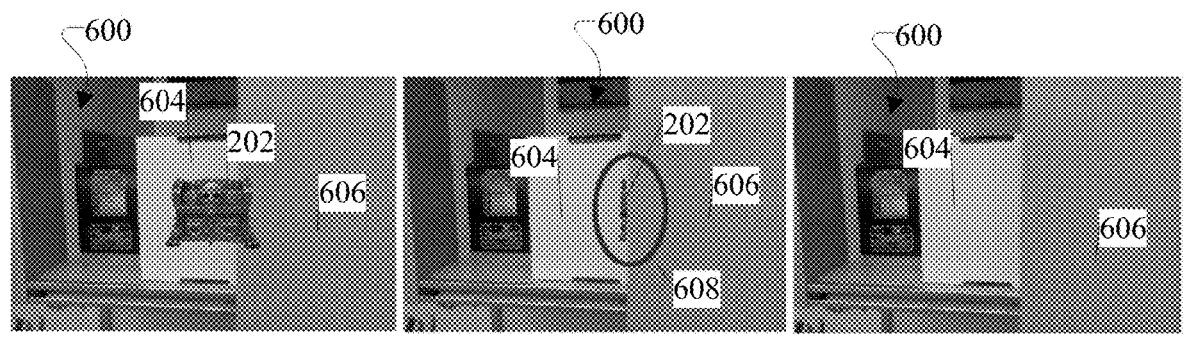
FIG. 20A is an example of an AR scene without dynamic occlusion handling according to an example embodiment of this disclosure.
FIG. 20B is an example of an AR scene with dynamic occlusion handling using raw depth data according to an example embodiment of this disclosure.
FIG. 20C is an example of an AR scene with dynamic occlusion handling using an enhanced depth map according to an example embodiment of this disclosure.
Figures 21A, 21B, 21C, 21D:
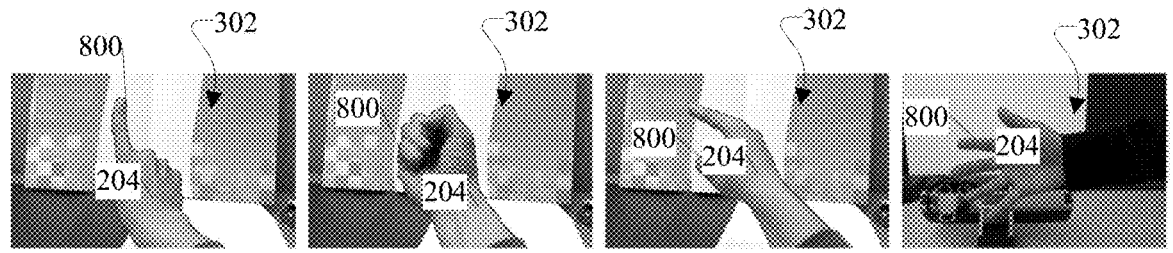
FIGS. 21A, 21B, 21C and 21D are color images with outlines of ground-truth boundaries according to an example embodiment of this disclosure.
Figures 22A, 22B, 22C, 22D:
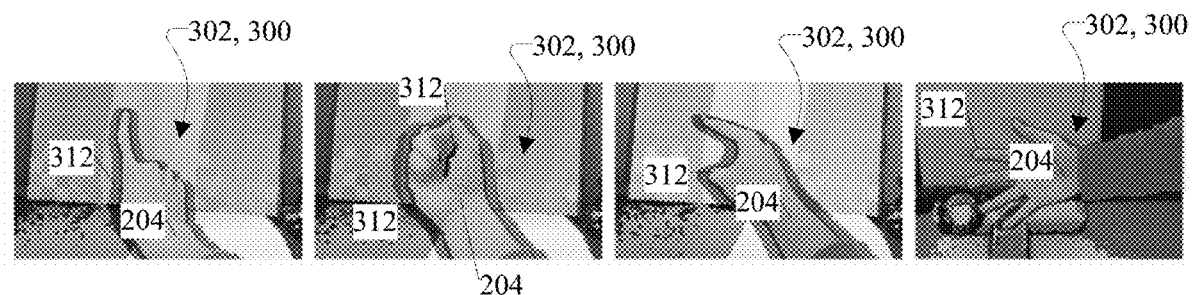
FIGS. 22A, 22B, 22C, and 22D are visualizations of raw depth maps overlaid over the corresponding color images of FIGS. 21A, 21B, 21C, and 21D, respectively, according to an example embodiment of this disclosure.
Figures 23A, 23B, 23C, 23D:
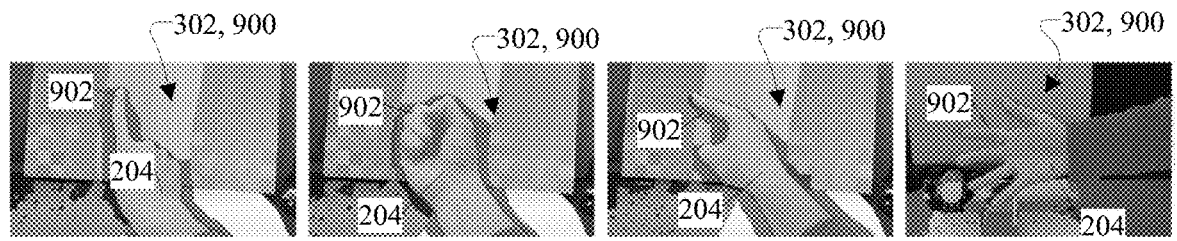
FIGS. 23A, 23B, 23C, and 23D are visualizations of enhanced depth maps overlaid over the corresponding color images of FIGS. 21A, 21B, 21C, and 21D, respectively, according to an example embodiment of this disclosure.

FIGS. 19A-19C and 20A 20C illustrate visual results of different occlusion handling strategies in an AR treasure hunting scenario. In this example, the virtual object 202 (e.g., treasure chest) should be positioned behind the box 604 in this AR scene 600. More specifically, FIGS. 19A and 20A illustrate visual effects without occlusion handling. In FIGS. 19A and 20A, without any occlusion handling, the virtual object 202 occludes the box 604 and the closet door 606 and is therefore not positioned behind the box 604, as intended. Meanwhile, in FIGS. 19B and 20B, when applying occlusion handling on raw depth data, the virtual object 202 is correctly positioned between the closet door 606, as intended, but incorrectly occludes the box 604. That is, the raw depth data of the raw depth map 300 clearly misses some values in the circled regions 608 and thus the virtual object 202 incorrectly occludes the box in these circled regions 608. In this case, as evidenced by FIGS. 19B and 20B, when the virtual object 202 occludes the real scene in an unintended manner, then the AR scene 600 suffers from undesired artifacts. In contrast, FIGS. 19C and 20C illustrate the visual effects with dynamic occlusion handling, as discussed herein, in which enhanced depth maps are used and contribute to the AR scene 600. As shown, in each of the AR scenes 600 of FIGS. 19C and 20C, the virtual object 202 is rendered behind both the box 604 and the closet door 606 in an appropriate manner and without any visual artifacts. That is, with dynamic occlusion handling, the user is provided with a proper and realistic AR experience.

FIGS. 21A to 23D illustrate object boundaries in color images, raw depth maps, and enhanced depth maps. Specifically, each of FIGS. 21A, 21B, 21C and 21D is a color image 302 with a ground-truth boundary 800 of the user's hand 204. In this regard, each of FIGS. 21A, 21B, 21C, and 21D presents different hand gestures and/or background scene. Turning to FIGS. 22A-22D and 23A 23D, these illustrations utilize, for instance, a standard JET color scheme, with the corresponding color images 302 overlaying their corresponding depth maps 300. More specifically, FIGS. 22A-22D include the raw depth maps 300 while FIGS. 23A-23D include the enhanced depth maps 900. As evidenced by a comparison of FIGS. 22A-22D with FIGS. 23A-23D, the object boundaries 902 of the hands 204 in the enhanced depth maps 900 correspond more closely to the ground-truth boundary 800 than the object boundaries 312 of the hands 204 in the raw depth maps 300. That is, the enhanced depth maps 900 provide improved object boundaries 902, thereby achieving dynamic occlusion handling that results in an improved AR experience.

Furthermore, FIGS. 21A-21D visualize the desired ground-truth boundary 800 of the hand 204 over the original color image 302. Ideally, the object boundary in the depth maps should match this curve. However, as shown in FIGS. 22A-22D, the raw depth maps 300 suffer from various types of noises and missing values, resulting in mismatches with the ground-truth boundary 800. For instance, in FIG. 22B, there is a hole in the palm region, creating a false object boundary. Meanwhile, FIGS. 23A-23D represent the results of example embodiments after depth map enhancement. As shown by the results of FIGS. 23A-23D, the process 400 improves the consistency of boundaries of objects between image data (e.g., RGB data) and depth data.

As discussed above, the system 100 provides dynamic occlusion handling, which enables accurate depth perception in AR applications. Dynamic occlusion handling therefore ensures a realistic and immersive AR experience. In general, existing solutions typically suffer from various limitations, e.g. static scene assumption or high computational complexity. In contrast, this system 100 is configured to implement a process 400 that includes a depth map enhancement process 480 for dynamic occlusion handling in AR applications. Advantageously, this system 100 implements an edge-snapping approach, formulated as discrete optimization, that improves the consistency of object boundaries between RGB data and depth data. In an example embodiment, the system 100 solves the optimization problem efficiently via dynamic programming. In addition, the system 100 is configured to run at an interactive rate on a computing platform, (e.g., tablet platform). Also, the system 100 provides a rendering strategy for glasses view 212 to avoid holes and artifacts due to interpolation that originate from differences between the video view 200 (data acquisition sensor) and the glasses view 212. Furthermore, experimental evaluations demonstrate that this edge-snapping approach largely enhances the raw sensor data and is particularly suitable compared to several related approaches in terms of both speed and quality. Also, unlike other approaches that focus on the entire image, this process 400 advantageously focuses on the edge regions. Moreover, the system 100 delivers visually pleasing dynamic occlusion effects during user interactions.

As aforementioned, in an example embodiment, the system 100 is configured to perform edge-snapping between the depth maps and color images, primarily based on image gradients. Additionally or alternatively, when the characteristics of the sensor data from the depth sensor 114 provides raw depth edges that are close to the corresponding desired color edges, the system 100 is configured to model the color characteristic of individual objects for segmentation. Additionally or alternatively, the system 100 is configured to further enhance the above-mentioned energy function by taking into account other information besides image gradients, such as that of color distributions or other relevant data, to better accommodate complicated scenarios such as a cluttered scene. Additionally or alternatively, the system 100 can consider and include temporal information. Additionally or alternatively, the system 100 can include explicit tracking of moving objects to enhance the robustness of the edge-snapping framework.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computing system comprising:
a processing system including at least one processing unit, the processing system being configured to implement a method that includes:
receiving a depth map with a first boundary of an object;
receiving a color image that corresponds to the depth map, the color image including a second boundary of the object;
extracting depth edge points of the first boundary from the depth map;
identifying candidates for the depth edge points along two-dimensional (2D) normal line segments in which each 2D normal line segment is perpendicular to a respective depth edge point using neighboring depth edge points;
identifying target depth edge points on the depth map from among the corresponding candidates by determining an optimal solution for the depth edge points via discrete energy minimization with respect to an energy function that includes at least a data term based on image gradients of the color image such that positions of the target depth edge points are based on positions of corresponding color edge points of the second boundary of the object in the color image; and
snapping the depth edge points to the target depth edge points such that the depth map is enhanced with an object boundary for the object.

2. The computing system of claim 1, wherein:
the processing system is in communication with a head mounted display that includes a depth sensor and a camera; and
the processing system receives the depth map from the depth sensor and the color image from the camera.

3. The computing system of claim 1, wherein the processing system is configured to:
(a) group the depth edge points into a group;
(b) order the depth edge points within the group;
(c) smooth 2D positions of the depth edge points with a low pass filter; and
(d) compute the 2D normal line segments for the depth edge points.

4. The computing system of claim 1, wherein the processing system is configured to perform dynamic occlusion handling based on the enhanced depth map.

5. The computing system of claim 1, wherein the processing system is configured to transform depth data of the enhanced depth map from video view to glasses view for an augmented reality application.

6. The computing system of claim 1, wherein the energy function further includes a smoothness term based on discrepancies associated with neighboring depth edge pixels.

7. A system for dynamic occlusion handling, the system comprising:
a depth sensor to provide a depth map;
a camera to provide a color image; and
a processing system including at least one processing unit, the processing system being configured to implement a method that includes:
receiving the depth map with a first boundary of an object;
receiving the color image that corresponds to the depth map, the color image including a second boundary of the object;
extracting depth edge points of the first boundary from the depth map;
identifying candidates for the depth edge points along two-dimensional (2D) normal line segments in which each 2D normal line segment is perpendicular to a respective depth edge point using neighboring depth edge points;
identifying target depth edge points on the depth map from among the corresponding candidates by determining an optimal solution for the depth edge points via discrete energy minimization with respect to an energy function that includes at least a data term based on image gradients of the color image such that positions of the target depth edge points are based on positions of corresponding color edge points of the second boundary of the object in the color image; and snapping the depth edge points to the target depth edge points such that the depth map is enhanced with an object boundary for the object.

8. The system of claim 7, further comprising:
a head mounted display on which the depth sensor and the camera are mounted.

9. The system of claim 7, wherein the processing system is configured to:
(a) group the depth edge points into a group;
(b) order the depth edge points within the group;
(c) smooth 2D positions of the depth edge points with a low pass filter; and
(d) compute the 2D normal line segments for the depth edge points.

10. The system of claim 7, wherein the processing system is configured to perform dynamic occlusion handling based on the enhanced depth map.

11. The system of claim 7, wherein the processing system is configured to transform depth data of the enhanced depth map from video view to glasses view for an augmented reality application.

12. The system of claim 7, wherein the energy function further includes a smoothness term based on discrepancies associated with neighboring depth edge pixels.

13. A computer-implemented method comprising:
receiving a depth map with a first boundary of an object;
receiving a color image that corresponds to the depth map, the color image including a second boundary of the object;
extracting depth edge points of the first boundary from the depth map;
identifying candidates for the depth edge points along two-dimensional (2D) normal line segments in which each 2D normal line segment is perpendicular to a respective depth edge point using neighboring depth edge points;

identifying target depth edge points on the depth map from among the corresponding candidates by determining an optimal solution for the depth edge points via discrete energy minimization with respect to an energy function that includes at least a data term based on image gradients of the color image such that positions of the target depth edge points are based on positions of corresponding color edge points of the second boundary of the object in the color image; and snapping the depth edge points to the target depth edge points such that the depth map is enhanced with an object boundary for the object.

14. The computer-implemented method of claim 13, further comprising:
grouping the depth edge points into a group;
ordering the group of depth edge points;
smoothing 2D positions of the depth edge points with a low pass filter; and
computing the 2D normal line segments for the depth edge points.

15. The computer-implemented method of claim 13, further comprising:
performing dynamic occlusion handling based on the enhanced depth map.

16. The computer-implemented method of claim 13, further comprising:
transforming depth data of the enhanced depth map from video view to glasses view for an augmented reality application.

17. The computer-implemented method of claim 13, wherein the energy function further includes a smoothness term based on discrepancies associated with neighboring depth edge pixels.

\* \* \* \* \*

UNITED STATES PATENT AND TRADEMARK OFFICE
CERTIFICATE OF CORRECTION

PATENT NO. : 10,706,613 B2  
APPLICATION NO. : 15/633221  
DATED : July 7, 2020  
INVENTOR(S) : Mao Ye et al.

Page 1 of 1

It is certified that error appears in the above-identified patent and that said Letters Patent is hereby corrected as shown below:

On the Title Page

On Page 2, under item (56), under sub-heading "OTHER PUBLICATIONS", the following reference should be added:
Ikeda et al., "Relighting With Dynamic Light Environments Using an RGB-D Camera", 2014 Information Processing Society of Japan, pp. 1-6.

Signed and Sealed this  
Eighth Day of December, 2020

Andrei Iancu  
*Director of the United States Patent and Trademark Office*